(12) United States Patent
Wallenås et al.

(10) Patent No.: US 12,065,233 B2
(45) Date of Patent: Aug. 20, 2024

(54) CARGO DOOR OPERATING METHOD AND DEVICE

(71) Applicant: SCANDINAVIAN CARGOLOADING TECHNOLOGIES AB, Lund (SE)

(72) Inventors: Anders Wallenås, Lomma (SE); Hans Bengtsson, Eslöv (SE)

(73) Assignee: SCANDINAVIAN CARGOLOADING TECHNOLOGIES AB, Lund (SE)

( * ) Notice: Subject to any disclaimer, the term of this patent is extended or adjusted under 35 U.S.C. 154(b) by 332 days.

(21) Appl. No.: 17/440,943

(22) PCT Filed: Mar. 19, 2020

(86) PCT No.: PCT/SE2020/050292
§ 371 (c)(1),
(2) Date: Sep. 20, 2021

(87) PCT Pub. No.: WO2020/190204
PCT Pub. Date: Sep. 24, 2020

(65) Prior Publication Data
US 2022/0162893 A1  May 26, 2022

(30) Foreign Application Priority Data

Mar. 20, 2019 (SE) .................................. 1930089-6

(51) Int. Cl.
*B64C 1/14* (2006.01)
*B64C 1/22* (2006.01)
*B64D 9/00* (2006.01)

(52) U.S. Cl.
CPC .............. *B64C 1/1415* (2013.01); *B64C 1/22* (2013.01); *B64D 9/00* (2013.01)

(58) Field of Classification Search
CPC ..... B64C 1/1415; B64C 1/1423; B64C 1/143; B64C 1/1407; E06B 3/509; E05D 15/58; E05D 15/581; E05D 15/582; E05D 15/583
See application file for complete search history.

(56) References Cited

U.S. PATENT DOCUMENTS

| 1,574,553 A | 2/1926 | Chase |
| 1,914,559 A | 6/1933 | Dath |

(Continued)

FOREIGN PATENT DOCUMENTS

| EP | 0994230 A2 * | 4/2000 |
| EP | 1 529 911 A2 | 5/2005 |

(Continued)

OTHER PUBLICATIONS

Extended European Search Report for European Application No. 20774388.1, dated Feb. 22, 2023.

*Primary Examiner* — Joseph W Sanderson
(74) *Attorney, Agent, or Firm* — Birch, Stewart, Kolasch & Birch, LLP

(57) ABSTRACT

A method for operating a cargo door of an aircraft includes opening the cargo door inwardly in relation to an opening by pivoting the cargo door to an open position adjacent a ceiling of a cargo space. The cargo door is supported by a door frame during opening of the cargo door. The method further includes moving the cargo door in relation to the door frame to a position wherein the opening is substantially free from the cargo door. The cargo door is supported by a support frame, moveable in relation to the door frame, during this movement.

12 Claims, 24 Drawing Sheets

(56) References Cited

U.S. PATENT DOCUMENTS

| | | | |
|---|---|---|---|
| 2,228,711 A | 1/1941 | Steuber | |
| 2,280,232 A | 4/1942 | Haseltine | |
| 2,564,988 A * | 8/1951 | Muller | B64C 1/1407 |
| | | | 244/129.5 |
| 2,573,236 A | 10/1951 | Whittit | |
| 2,751,636 A | 6/1956 | Heinemann et al. | |
| 2,763,900 A | 9/1956 | McAfee et al. | |
| 3,020,603 A | 2/1962 | Soddy | |
| 3,051,280 A | 8/1962 | Bergman et al. | |
| 3,591,111 A | 7/1971 | Spence | |
| 3,906,668 A | 9/1975 | Simmons | |
| 4,181,221 A | 1/1980 | Tennant | |
| 4,375,876 A * | 3/1983 | Stewart | B64C 1/1407 |
| | | | 244/129.5 |
| 4,544,319 A | 10/1985 | Folling et al. | |
| 4,601,446 A | 7/1986 | Opsahl | |
| 4,780,043 A | 10/1988 | Fenner et al. | |
| 4,785,741 A | 11/1988 | Gronow | |
| 4,805,852 A | 2/1989 | Nordstrom | |
| 4,854,010 A | 8/1989 | Maraghe et al. | |
| 4,860,973 A | 8/1989 | Fenner | |
| 5,163,801 A | 11/1992 | Nordström | |
| 5,335,880 A | 8/1994 | Klug | |
| 5,704,569 A | 1/1998 | Daniels | |
| 5,823,473 A | 10/1998 | Odell et al. | |
| 6,109,563 A | 8/2000 | Verhoeven et al. | |
| 6,116,542 A | 9/2000 | Erben | |
| 6,606,763 B1 | 8/2003 | Brückner | |
| 6,616,097 B2 * | 9/2003 | Hilbert | B64D 7/00 |
| | | | 244/118.1 |
| 6,619,591 B2 | 9/2003 | Erben et al. | |
| 7,883,058 B2 | 2/2011 | Erben et al. | |
| 8,807,482 B2 * | 8/2014 | Woodland | B64C 1/18 |
| | | | 244/129.4 |
| 8,984,811 B2 | 3/2015 | Fairchild | |
| 9,476,246 B2 | 10/2016 | Fairchild | |
| 9,630,700 B2 | 4/2017 | Kammerer et al. | |
| 9,663,217 B1 * | 5/2017 | Da Silva | B64F 5/40 |
| 10,005,538 B2 * | 6/2018 | Probst | B64C 1/24 |
| 10,435,181 B2 * | 10/2019 | Scotton | B05D 1/02 |
| 11,198,498 B2 * | 12/2021 | Vergnot | B64C 1/143 |
| 11,518,491 B2 * | 12/2022 | Linde | E05D 15/56 |
| 11,668,127 B2 * | 6/2023 | Chambers | B64C 1/1438 |
| | | | 49/210 |
| 2010/0059628 A1 | 3/2010 | Kobayashi et al. | |
| 2010/0294888 A1 * | 11/2010 | Texcier | B64C 1/143 |
| | | | 244/129.5 |
| 2011/0315822 A1 | 12/2011 | Fairchild | |
| 2015/0152677 A1 * | 6/2015 | Fairchild | B60J 5/062 |
| | | | 49/109 |
| 2016/0214701 A1 * | 7/2016 | Probst | B64C 1/24 |
| 2016/0332716 A1 | 11/2016 | Kammerer et al. | |
| 2017/0129584 A1 * | 5/2017 | Da Silva | B64C 1/1407 |
| 2018/0170579 A1 * | 6/2018 | Scotton | B05B 13/069 |
| 2018/0273156 A1 | 9/2018 | Vergnot et al. | |
| 2020/0172222 A1 * | 6/2020 | Linde | B64C 1/143 |
| 2021/0123278 A1 * | 4/2021 | Chambers | E05D 15/248 |

FOREIGN PATENT DOCUMENTS

| | | |
|---|---|---|
| EP | 2 585 324 B1 | 5/2017 |
| EP | 3 050 794 B1 | 5/2017 |
| EP | 3 165 445 A1 | 5/2017 |
| EP | 3 812 262 A1 | 4/2021 |
| WO | WO 89/09165 A1 | 10/1989 |
| WO | WO 2009/112936 A1 | 9/2009 |
| WO | WO 2015/109352 A1 | 7/2015 |
| WO | WO 2017/056036 A1 | 4/2017 |

\* cited by examiner

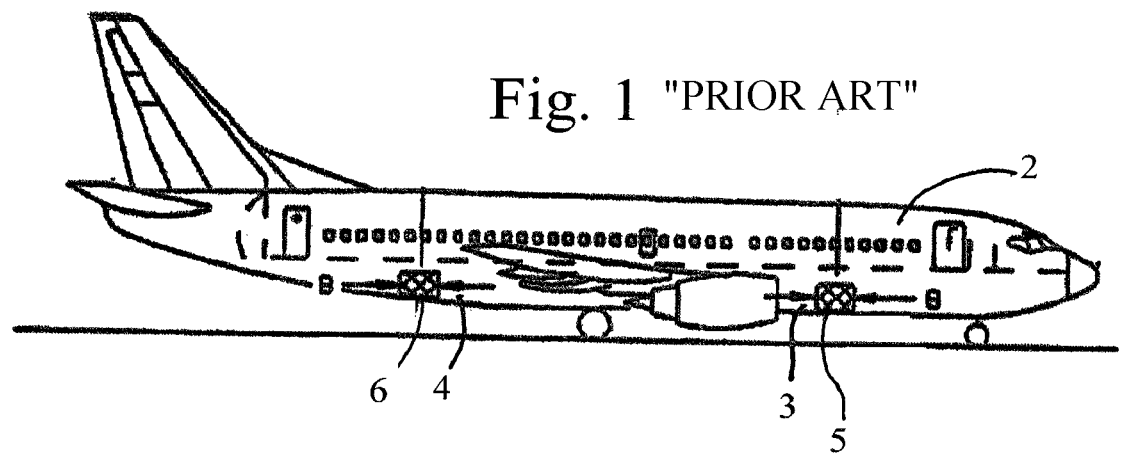
Fig. 1 "PRIOR ART"
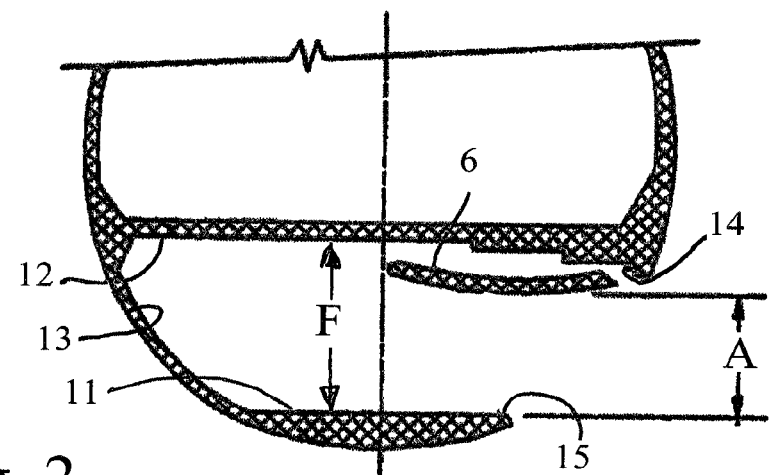
Fig. 2
"PRIOR ART"

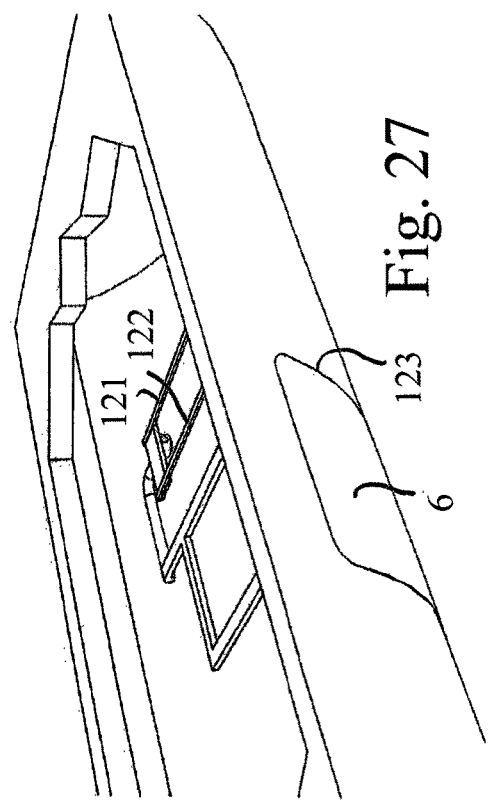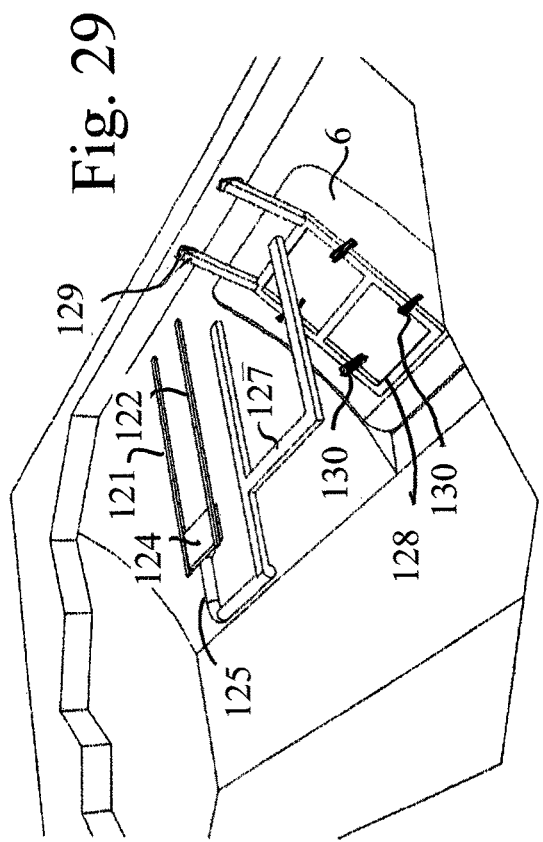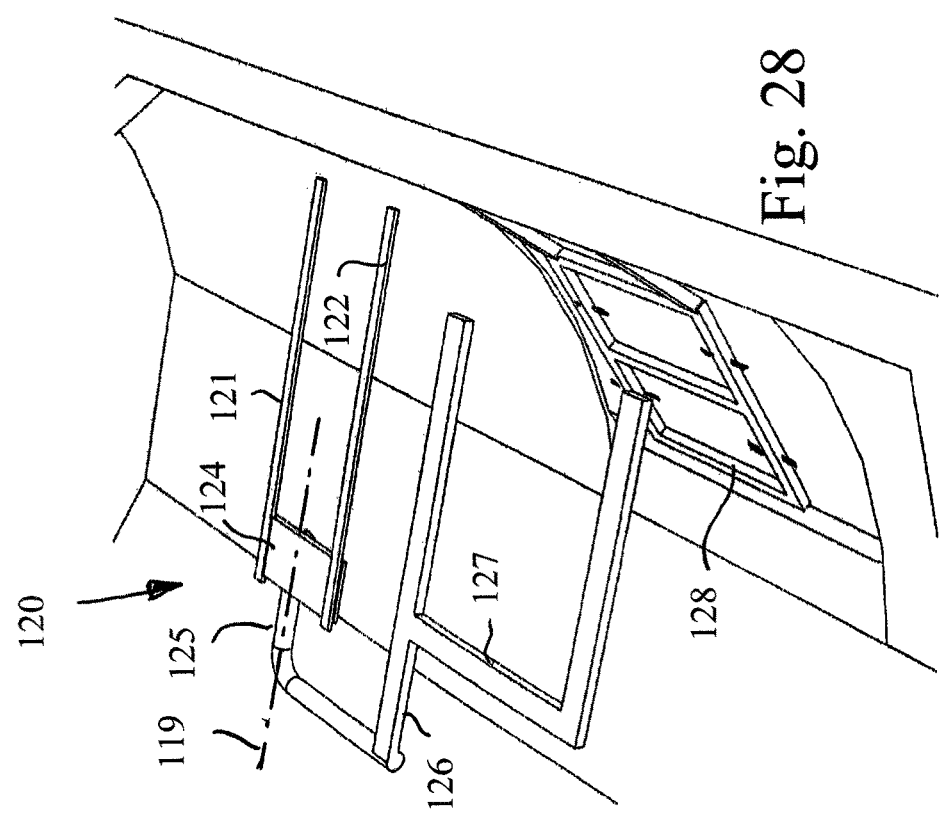

CARGO DOOR OPERATING METHOD AND DEVICE

FIELD OF INVENTION

The present invention relates to an aircraft and more specifically to a method and device for operating a cargo door of such an aircraft.

BACKGROUND

A passenger aircraft is normally provided with a longitudinal floor/ceiling dividing the aircraft into an upper passenger space and a lower cargo space comprising cargo compartments. The cargo space additionally comprises other equipment required for the aircraft.

The present invention may be used on any aircraft. However, below, the aircraft Boeing 737 is discussed as an example. Boeing 737 has a forward cargo compartment accessible via a forward cargo door and an aft cargo compartment accessible via an aft cargo door. Each cargo door opens inwardly into the cargo space, which means that the cargo door can be made slightly larger than the cargo door opening and hence be supported and sealed towards the edges of the cargo door opening along the entire periphery thereof, when the cargo door is in its closed position. This is an advantage since the cargo door is exposed to great forces at a cruising height of 10000 m. The cargo door is approximately one square meter and is exposed to 50000 N because of the pressure difference inside the aircraft and outside the aircraft, which pressure difference may be 0.5 atmospheres.

The cargo door at Boeing 737 is attached to the aircraft by means of two hinges arranged at the top of the cargo door. When the cargo door is pivoted inwardly, it will occupy some space close to the ceiling of the cargo space, which limits the height of cargo that can be loaded through the cargo door. In fact, there is lost about 30% of the height and of the cargo space because of the cargo door. This situation is illustrated in the patent document WO89/09165A1.

Other aircrafts are constructed with cargo doors which open outwardly, see for example the patent document U.S. Pat. No. 5,335,880A. As explained above, the fuselage and the hinges of the cargo door have to be constructed to withstand high forces arising at high altitudes, which places high demands on such mechanical parts and the maintenance thereof.

If the cargo doors of the aircraft Boeing 737 and similar aircrafts having inwardly opening cargo doors should be reconstructed into outwardly opening cargo doors, the complete construction of the fuselage adjacent the cargo door needs to be recalculated for stresses and strength, which is hardly possible without very large efforts and costs. Thus, it seems that Boeing 737 and similar aircrafts will continue to suffer from poor filling of cargo spaces because of inwardly opening cargo doors.

SUMMARY OF THE INVENTION

Accordingly, an object of the present invention is to mitigate, alleviate or eliminate one or more of the above-identified deficiencies and disadvantages singly or in any combination.

A further object of the present invention is to provide a method and a device for enabling loading of a cargo space comprising a cargo door pivoted inwards, without loosing a large cargo space.

Another object of the present invention is to provide a retrofit for rebuilding aircraft doors, which opens inwardly, in order to enable better filling of the cargo spaces.

In an aspect, there is provided a method for operating a cargo door of an aircraft, comprising: opening the cargo door inwardly in relation to a cargo door opening via door hinges attached to the aircraft adjacent the cargo door opening by pivoting the cargo door from a closed position to an open position, whereby the cargo door in the open position is positioned adjacent a ceiling of a cargo space, whereby the cargo door is supported by a door frame during opening of the cargo door; moving the cargo door in relation to the door frame and the hinges to a free position wherein the cargo door opening is substantially free from the cargo door, wherein the cargo door is supported by a support frame during the movement, which support frame is moveable in relation to the door frame.

In an embodiment, the method may further comprise: separating the support frame from the door frame and the door hinges, whereby the cargo door is supported by the support frame.

In another embodiment, the method may further comprise: tilting the cargo door until it is substantially parallel to the diagonal of the cargo door opening; and moving the tilted cargo door out through the cargo door opening, wherein the support frame is attached to the aircraft via a moving mechanism. The method may further comprise: moving the cargo door to a side of the cargo door opening outside the aircraft.

In a further embodiment, the method may further comprise: moving the cargo door supported by the support frame in a longitudinal direction of the aircraft until the cargo door is free from the cargo door opening.

In a yet further embodiment, the method may further comprise: moving the cargo door supported by the support frame in a transversal direction; and pivoting the cargo door around a horizontal shaft to a vertical position free from the cargo door opening.

In a still further embodiment, the method may further comprise: moving the cargo door supported by the support frame in a longitudinal direction until the cargo door is free from the cargo door opening; wherein the support frame is supported by the door frame and the hinges and the support frame is moveable in relation to the door frame, for example by rails.

In yet another embodiment, the method may further comprise: releasably locking the door frame to the aircraft in the open position of the cargo door.

In still another embodiment, the method may further comprise: receiving a load pallet by an inner conveyor arranged in a cargo compartment to be loaded via the open door, which inner conveyor is substantially horizontal, wherein the load pallet has a horizontal pivot axis and a vertical division plan parallel with the pivot axis; when the load pallet passes to the start of the inner conveyor, pivoting the load pallet around the pivot axis so that a first part of the load pallet is free to pass further into the cargo compartment; and pulling the load pallet further into the cargo compartment by the inner conveyor until the complete load pallet is entered into the cargo compartment.

In another aspect of the invention, there is provided a device for operating a cargo door of an aircraft, comprising: hinges for attaching the cargo door to the aircraft, whereby the cargo door is pivotable from a closed position to an open position, wherein the cargo door in the open position is positioned adjacent a ceiling of a cargo space; a door frame, which attaches the cargo door to the hinges; a support frame arranged to support the cargo door during movement of the cargo door to a free position wherein the cargo door opening is substantially free from the cargo door, a movement mechanism for moving the support frame supporting the cargo door relative to the door frame.

In an embodiment, the device may further comprise: the door frame comprising a longitudinal door rail; the support frame comprising a longitudinal support rail; a guide rail connecting the door rail to the support rail so that the support rail is moveable in relation the door rail, whereby the cargo door supported by the support frame is moveable to the free position.

In another embodiment, the device may further comprise: the support frame having a dimension which is compatible with the door frame; an attachment member for attaching the door frame to the cargo door wherein the attachment member is actuable for releasing the cargo door from the door frame (96) and for supporting the cargo door by the support frame (105); and translatory means for moving the cargo door the free position.

In a further embodiment, the device may further comprise: a support plate moveable in a transversal direction; the support frame being attached to the support plate and pivotable by a pivot arm into a position adjacent the door frame; a pivoting means for pivoting the cargo door when attached to the support frame whereby the cargo door is arranged in a position parallel with a diagonal of a cargo door opening; a translatory means for moving the cargo door out of the cargo door opening. The device may further comprise: a swinging means for swinging the cargo door outside the cargo door opening. The pivoting means for pivoting the cargo door may comprise at least one bearing and a motor for pivoting the pivot arm.

In a further aspect, there is provided a method for loading a load pallet through a cargo door opening, comprising: loading a load pallet through the cargo door opening by means of an outer conveyor having a predetermined slope angle in relation to the horizontal, so that the load pallet passes through the cargo door opening without interfering with an upper rim of the cargo door opening. The predetermined slope angle may be at least one of: between 3° and 15°, between 5° and 10°, and about 7°.

In another embodiment, the method may further comprise: receiving the load pallet by an inner conveyor having the same slope as the outer conveyor, pivoting the inner conveyor to half the slope angle of said outer conveyor; pulling the load pallet further into the cargo compartment by means of the inner conveyor; and pivoting the inner conveyor to a horizontal position, and pulling the load pallet further into the cargo compartment into a final position.

In a further embodiment, the method may further comprise: receiving the load pallet by an inner conveyor being substantially horizontal, said load pallet having a horizontal pivot axis and a vertical division plane parallel with said pivot axis; when the load pallet passes to the start of the inner conveyor, the load pallet is pivoted around said pivot axis so that a first part of the load pallet is free to pass further into the cargo compartment; and pulling the load pallet further into the cargo compartment by said inner conveyor until the complete load pallet is entered into said cargo compartment.

In a still further aspect, there is provided a device for operating a cargo door of an aircraft, comprising: a cargo door arranged to be opened inwardly in relation to a cargo door opening of a cargo space of the aircraft; pivotable links or guides arranged moveable in rails arranged for moving the cargo door to a side space adjacent the cargo door opening inside the aircraft. The device may further comprise: rails arranged in the cargo space parallel with the longitudinal axis of the aircraft; link arms moveable along said linear rails; connector elements for connecting said cargo door to said link arms; whereby moving said link arms along said rails results in moving said cargo door to said side space adjacent the cargo door opening inside the aircraft. The device may further comprise: link arms which are pivotable around vertical shafts arranged in said cargo space; connector members which are arranged for pivotably connecting said link arms to said cargo door; whereby pivoting said link arms over about 180° results in moving said cargo door to said side space adjacent the cargo door opening inside the aircraft. The device may further comprise: a link arm which is pivotable around a vertical shaft arranged in said cargo space; connector members which are arranged for pivotably connecting said link arms to said cargo door; a guide rail arranged at a floor of the cargo space; a guide member arranged at a lower corner of the cargo door and moveable along said guide rail; whereby pivoting said link arm over about 180° results in moving said cargo door to said side space adjacent the cargo door opening inside the aircraft.

BRIEF DESCRIPTION OF THE DRAWINGS

Further objects, features and advantages of the invention will become apparent from the following detailed description of embodiments of the invention with reference to the drawings, in which:

FIG. 1 is a side view of an aircraft such as Boeing 737, wherein the invention can be utilized.

FIG. 2 is a cross-section of the aircraft according to FIG. 1 in a typical cargo door position.

FIGS. 27 to 40 are consecutive perspective views of the cargo door positions during opening of the cargo door, according to a further embodiment of the invention.

DETAILED DESCRIPTION OF EMBODIMENTS

Figure 3:
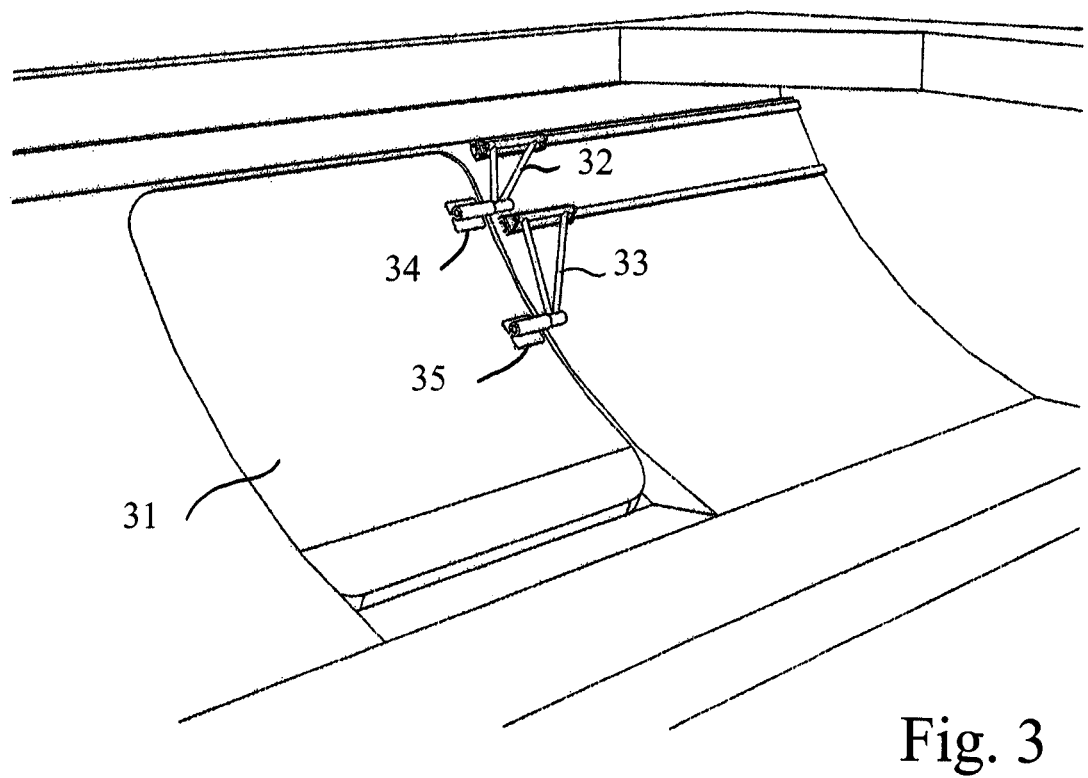
FIGS. 3 to 14 are consecutive perspective views of cargo door positions during inward opening of the cargo door, according to embodiments of the invention.
Figure 4:
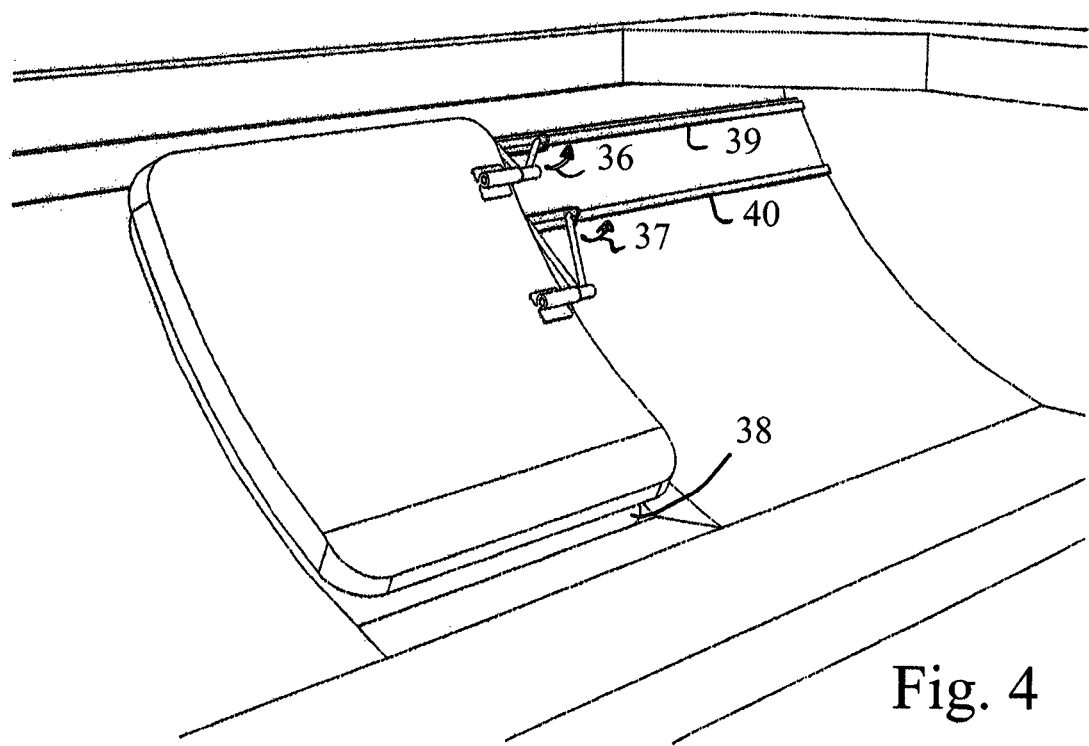

Below, several embodiments of the invention will be described. These embodiments are described in illustrating purpose in order to enable a skilled person to carry out the invention and to disclose the best mode. However, such embodiments do not limit the scope of the invention. Moreover, certain combinations of features are shown and discussed. However, other combinations of the different features are possible within the scope of the invention.

FIG. 1 is a side view of an aircraft of the type Boeing 737, comprising a passenger space 2 and two cargo compartments 3 and 4 having a forward cargo door 5 and an aft cargo door 6.

FIG. 2 is a partial cross-section of the aircraft at the position of the aft cargo door 6. There is shown a cargo compartment floor 11 and a cargo compartment ceiling 12, which at the same time is the floor of the passenger space 2. The cargo compartment is further limited sideways by side walls 13 and 14. In the sidewall 14, a cargo door opening 15 is arranged for cargo door 6. The cargo door 6 is not flat but has a beveled or curved configuration. When the cargo door 6 is swung or pivoted to the open position as shown in FIG. 2, it is held towards the ceiling 12 by links, not shown.

As indicated by arrow A, the free height to load cargo is smaller than the free height of the cargo compartment shown by arrow F and may be about 30% smaller. Thus, the cargo compartment can only be filled up to 70%.

There is a need to be able to use the cargo space more efficiently while still having the cargo door opening inwards.

If there is a side space at the side of the cargo door, the cargo door may be moved sideways into said side space. This is illustrated in FIGS. 3 to 14.

Figure 5:
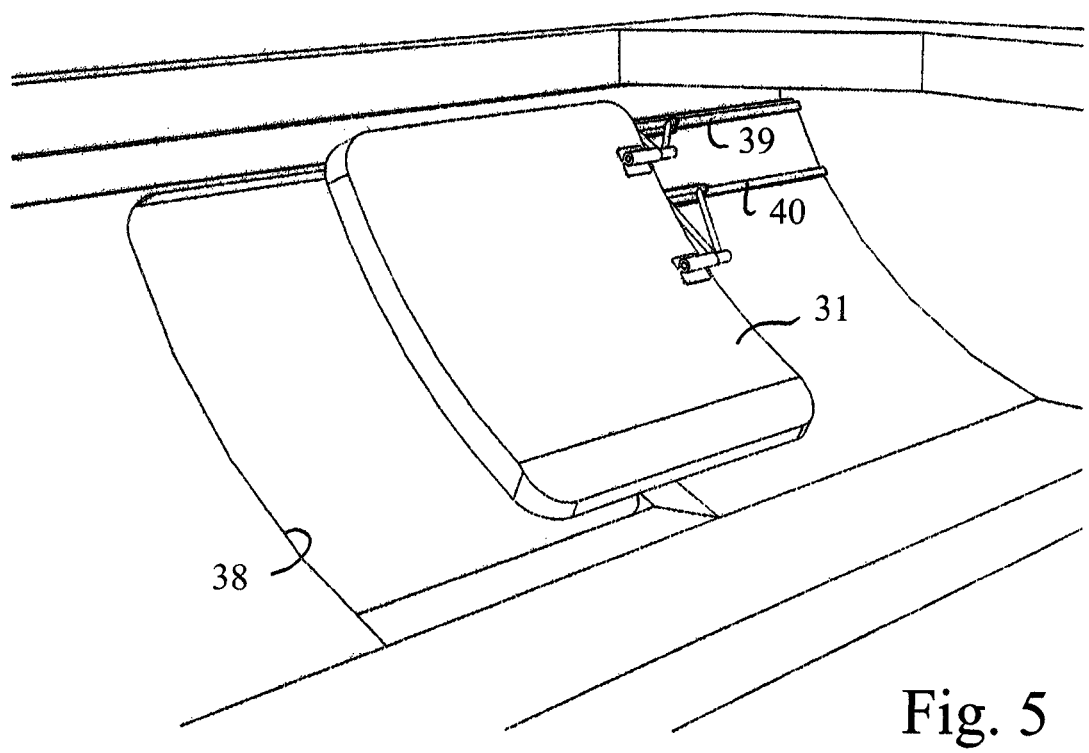
Figure 6:
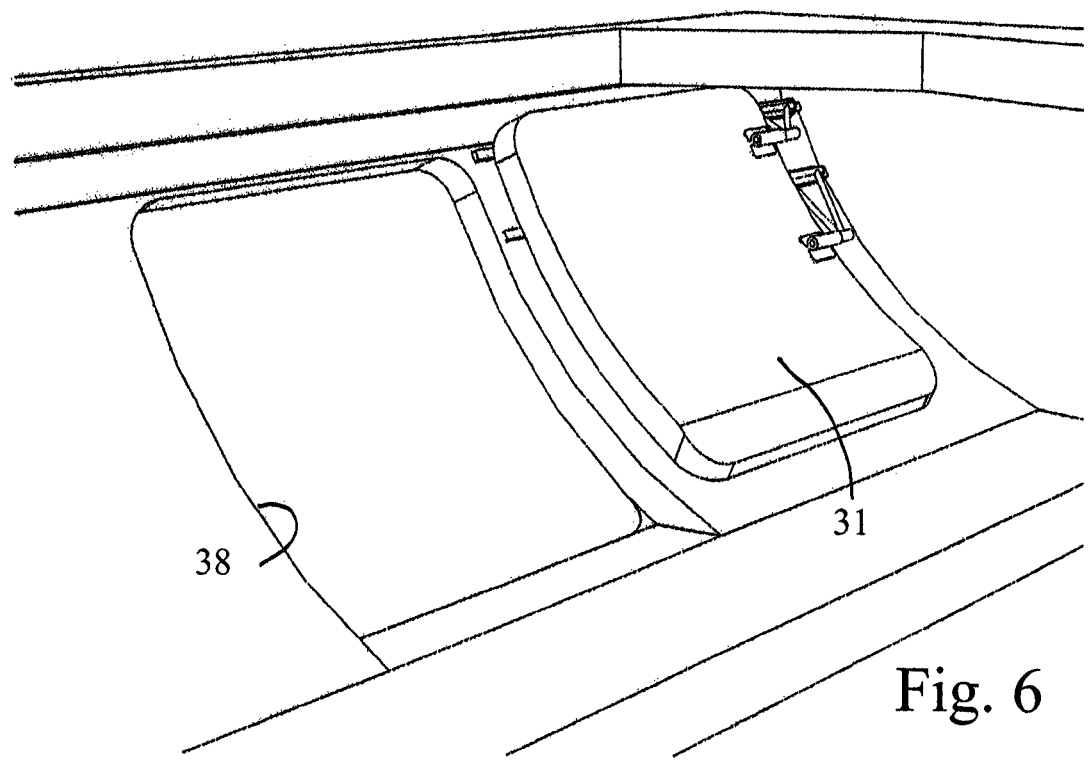
Figure 7:
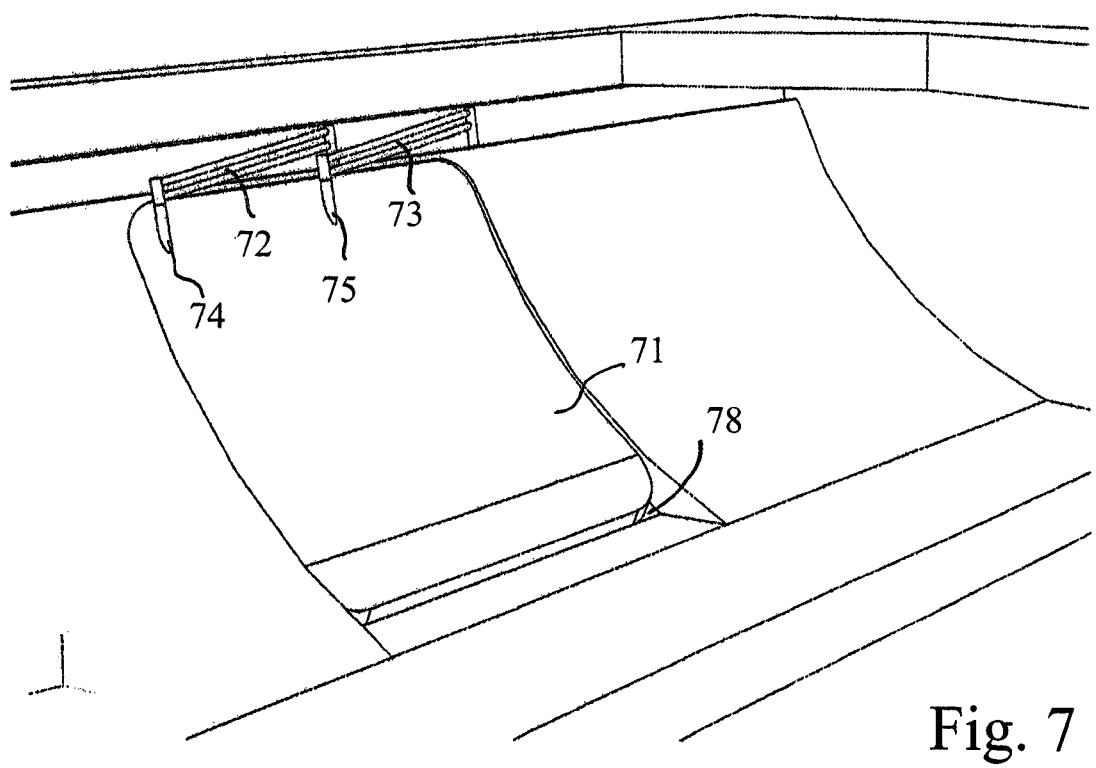
Figure 8:
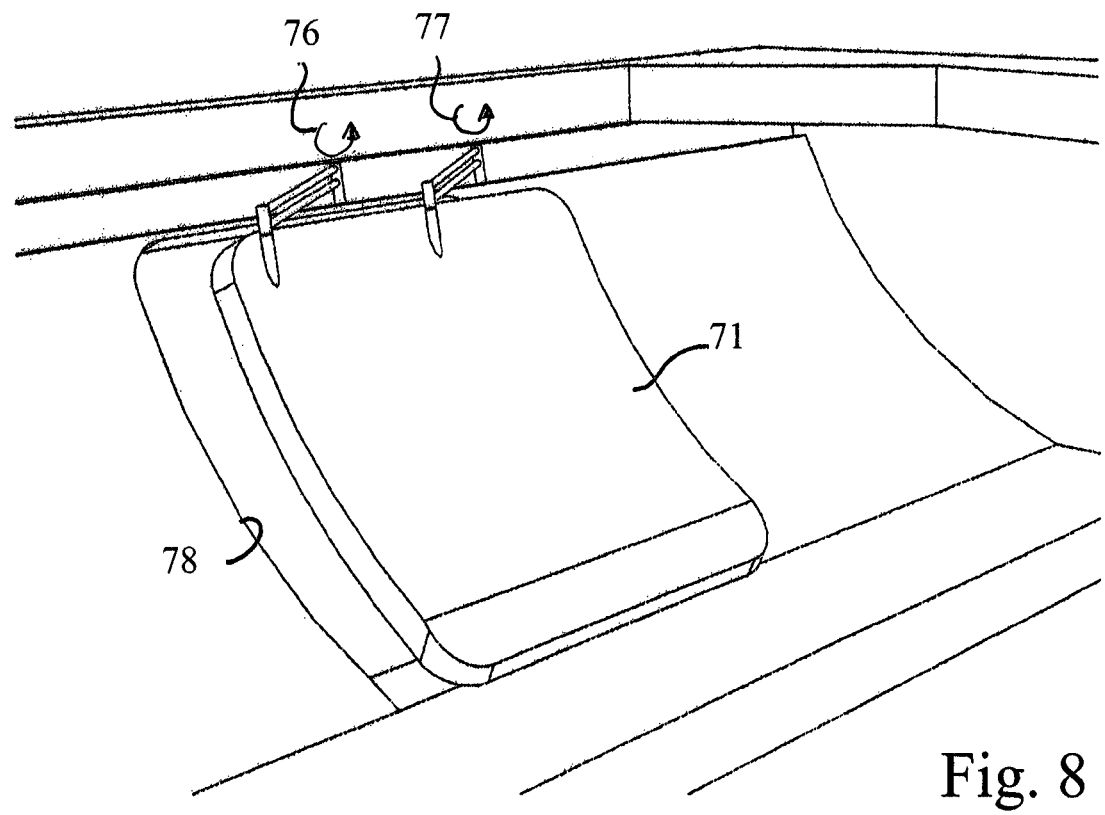

A first embodiment is shown in FIGS. 3 to 6. The cargo door 31 is shown in its closed position in FIG. 3. The cargo door is connected to two link arms 32, 33 by connector members 34, 35. The links may be pivoted by means of a motor as shown by arrows 36, 37, see FIG. 4. When the links are pivoted as shown by the arrows, the door 31 is lifted up from its opening 38, and is free to be moved. The link arms 32, 33 are longitudinally moveable in rails 39, 40 to the right as shown in FIG. 5. FIG. 6 shows the end position of the door 31, wherein the door is free from the door opening 38. The door 31 does no longer prevent full use of the door opening 38.

Figure 9:
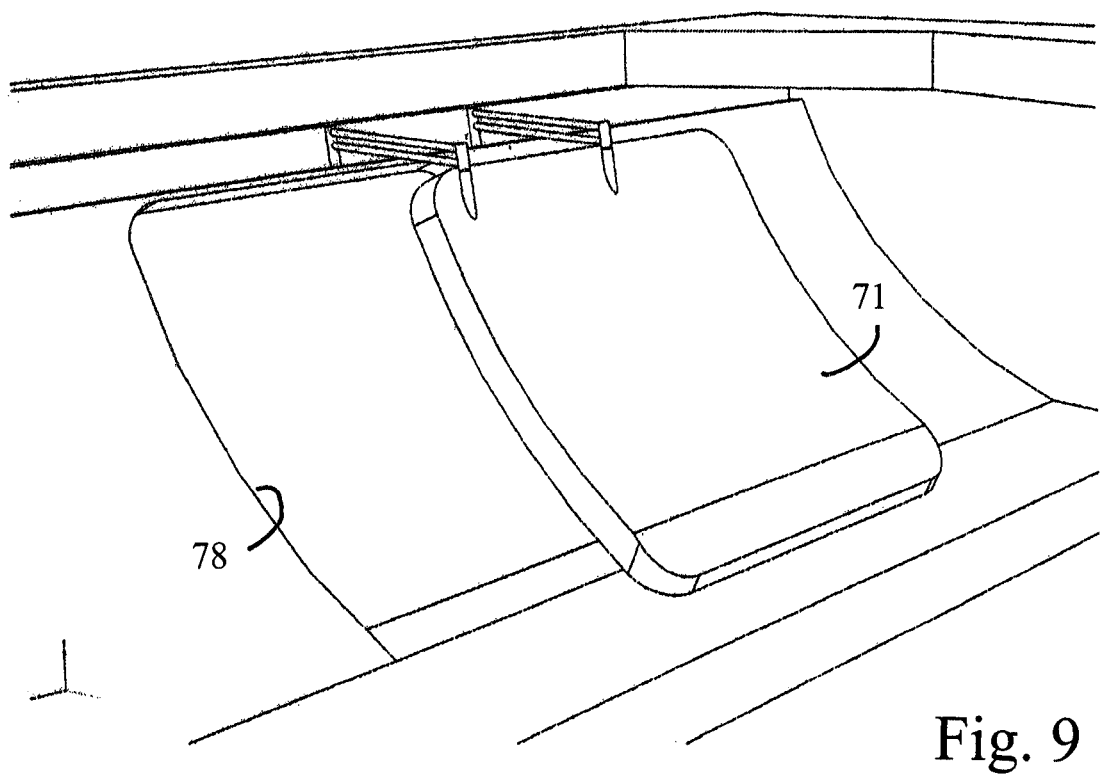
Figure 10:
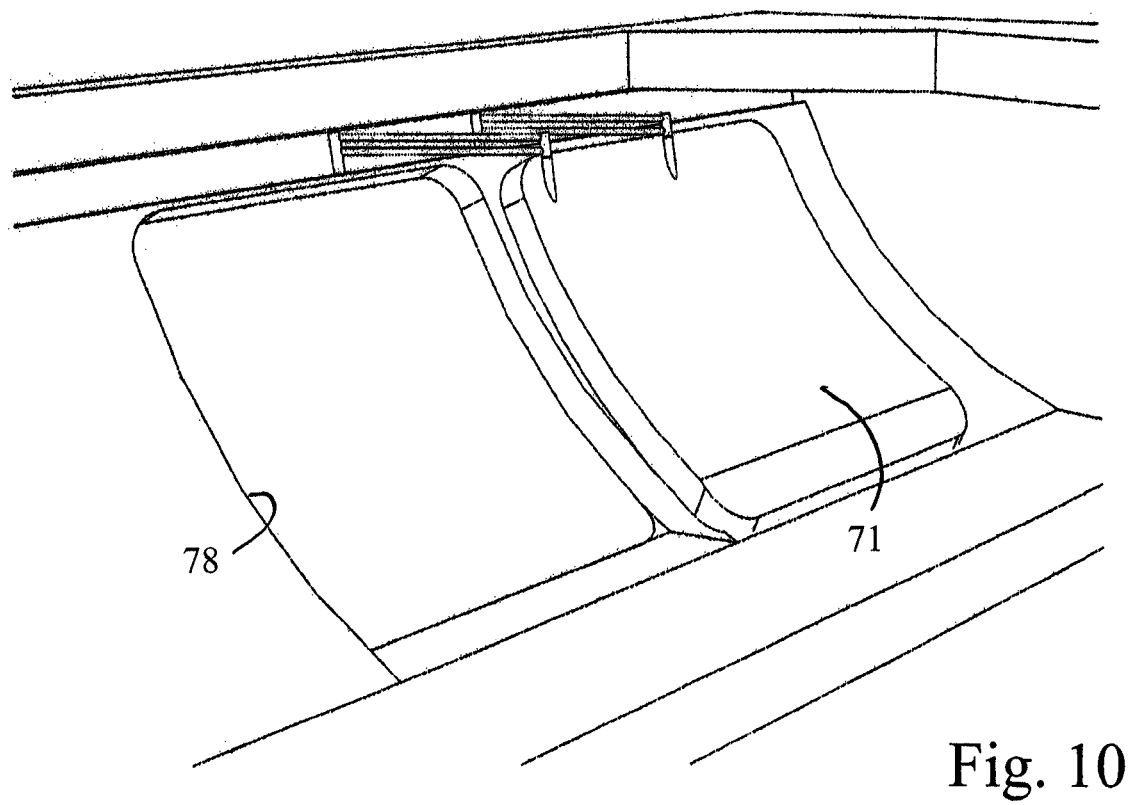
Figure 11:
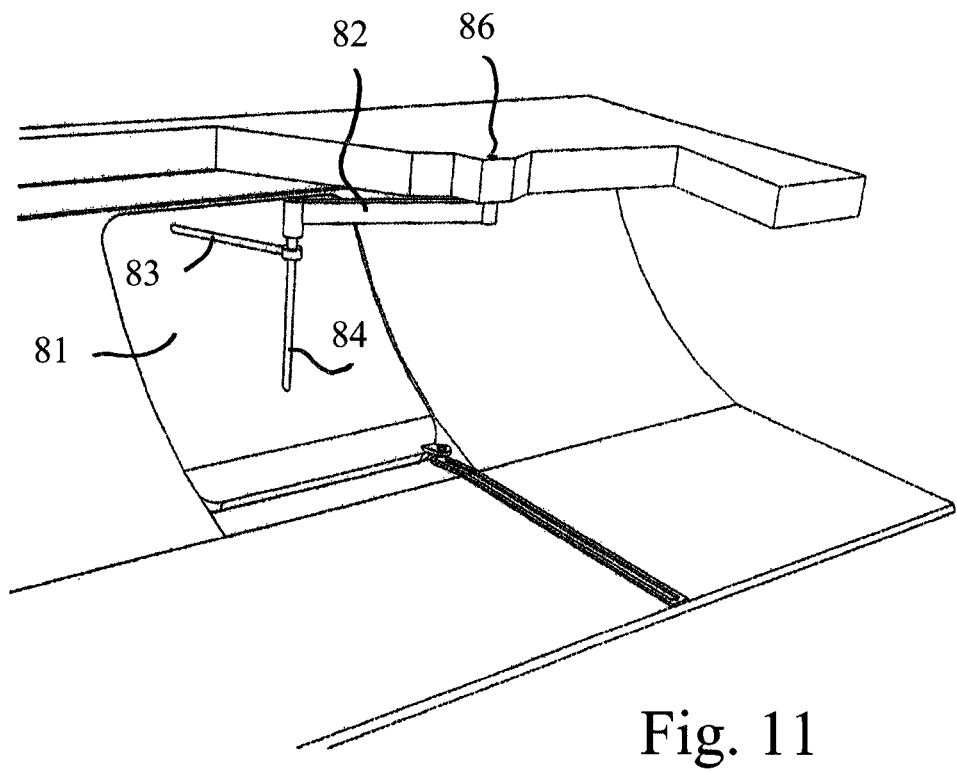

Another embodiment is shown in FIGS. 7 to 10. The cargo door 71 is shown in its closed position in FIG. 7. The cargo door 71 is connected to two link arms 72, 73 by pivotable connector members 74, 75 attached to the cargo door. The links may be pivoted by a motor as shown by arrows 76, 77, see FIG. 8. When the links are pivoted as shown by the arrows, the door 71 is lifted up from its opening 78. At continued pivoting of the link arms as shown in FIG. 9, the door is swung to the right over an arc to a final storage position as shown in FIG. 10, wherein the door is free from the door opening 78. The door does no longer prevent full use of the door opening.

Figure 12:
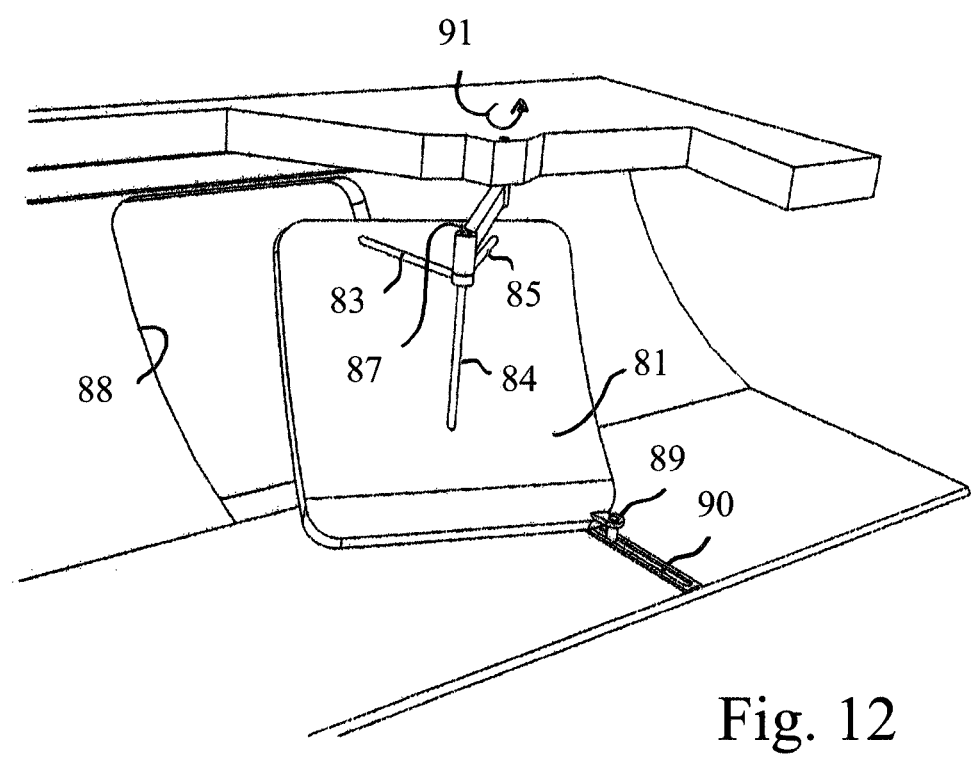
Figure 13:
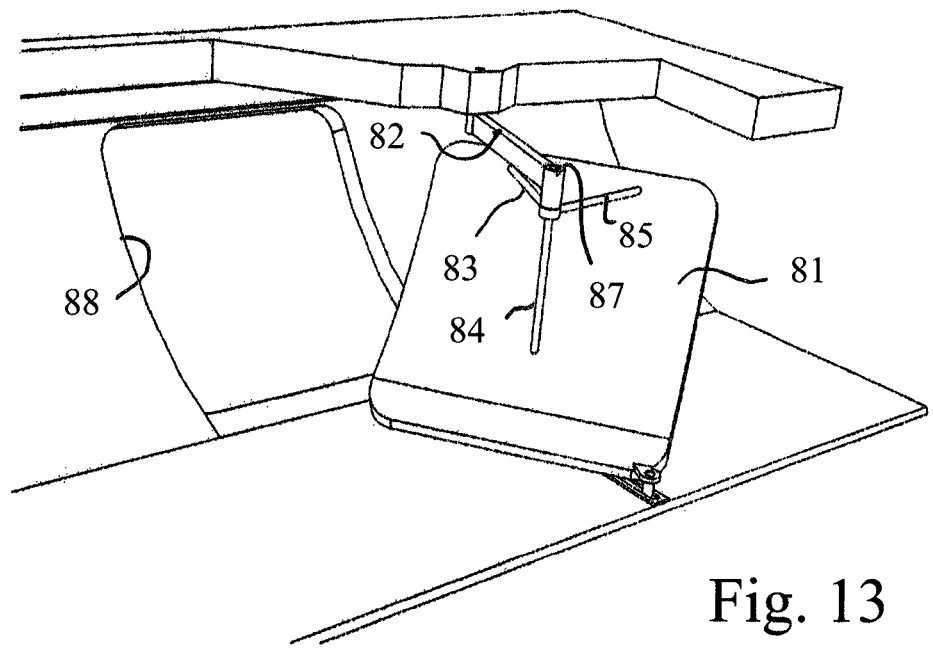
Figure 14:
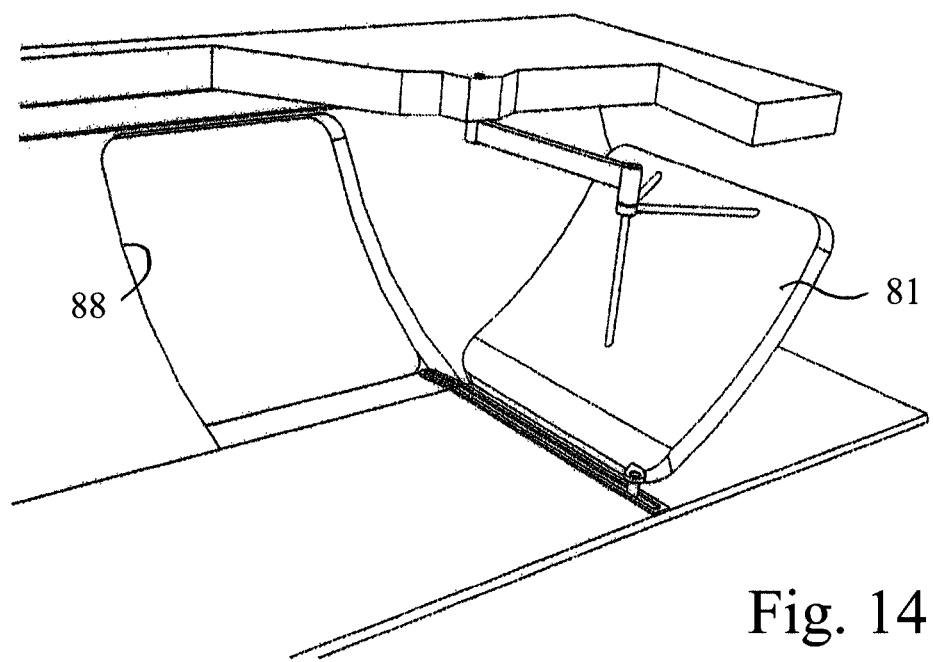

A further embodiment is shown in FIGS. 11 to 14. The cargo door 81 is shown in its closed position in FIG. 11. The cargo door 81 is connected to a single link arm 82 by three fixed connector members 83, 84, 85. The link arm 82 is pivotable around a first axis 86 in the cargo space and the connector members are attached to the other end of the link arm and are pivotable around a second axis 87. A bottom corner of the cargo door 81 is provided with a guide member 89, which is arranged to run inside a rail 90 arranged in the floor of the cargo space along a transversal direction of the cargo space. A motor is arranged to rotate the link arm 82 as shown by arrow 91, whereupon the cargo door 81 is moved from its closed position and the guide member 89 follows the guide rail as shown in FIG. 12. At continued pivoting of the link arm 82 as shown in FIG. 13, the door is swung to the right over an arc to a final storage position as shown in FIG. 14, wherein the door is free from the door opening 88. The door does no longer prevent full use of the door opening.

The rail 90 may be arranged at 90° in relation to the longitudinal axis as shown in FIGS. 11 to 14. However, the rail 90 may be arranged at other angles to the longitudinal axis, such as 30° or 60° or any other angle. In addition, the rail 90 may be arranged non-linear, for example in a curved configuration, for example an arced configuration.

In the embodiments according to FIGS. 3 to 14, the original cargo door hinges supporting the cargo door have been removed. The cargo door is supported by the link arms and is moved to the side, either by link arms and rails or only link arms. When the cargo door is moved back for closing the cargo opening, locking means in the rim of the cargo door co-operates with corresponding locking means arranged at the rim of the door opening. The movements described in relation to the embodiments of FIGS. 3 to 14 can be performed by an electric motor, but may alternatively be performed manually by a user, which is to open the door. The door is supported by springs so that the door can easily be moved by a user without using large forces.

In certain applications, it is desired to keep the original cargo door hinges and still move the door to the side. In this case, the cargo door may be separated from the original cargo door hinges. In the embodiments shown in FIGS. 15 to 38, the cargo door is opened in a normal manner by pivoting the door around the door hinges, so that the door assumes a substantial horizontal position as shown in FIG. 2. Thereafter, the cargo door is made moveable in relation to the hinges and moved to a storing position, inside the cargo space, for example at the side thereof. The cargo door is supported by a support frame during such movements.

Figure 15:
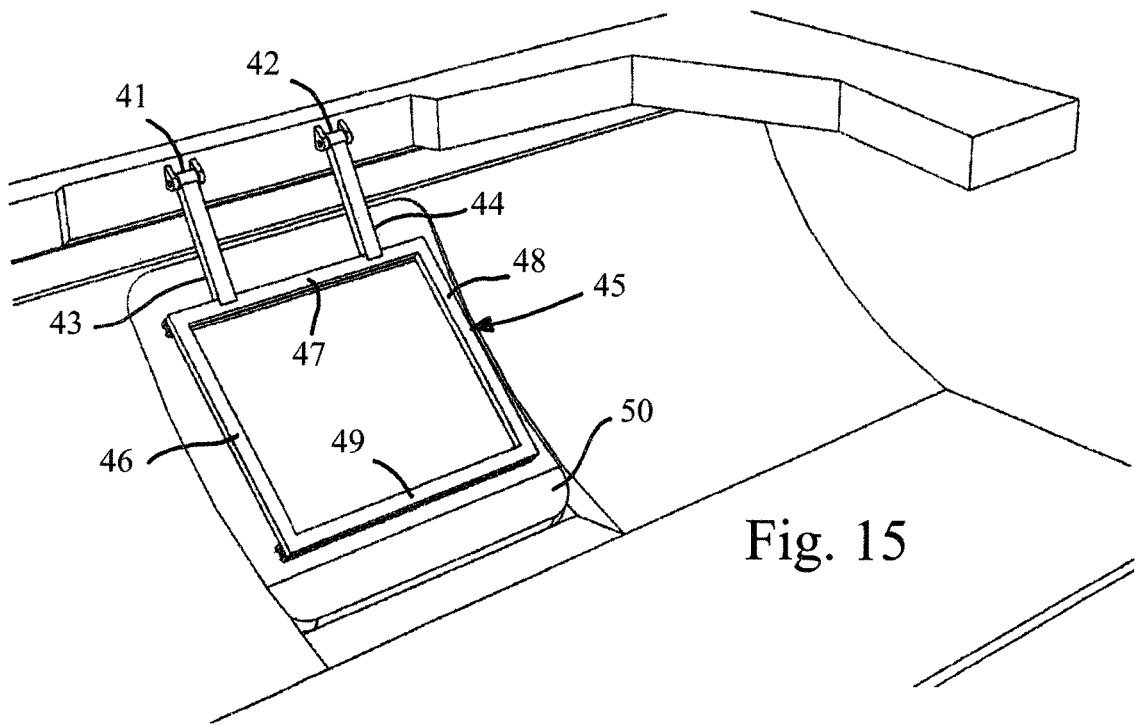
FIGS. 15 to 17 are consecutive perspective views of cargo door positions during inward opening of the cargo door, according to an alternative embodiment of the invention.
Figure 16:
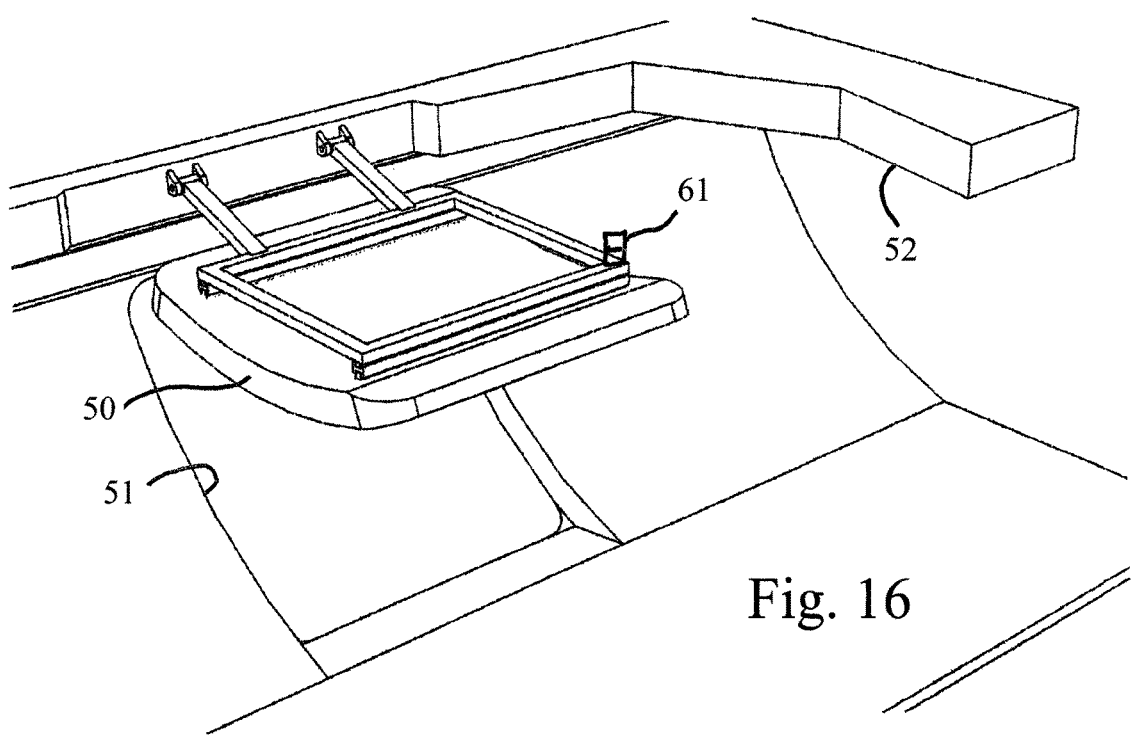
Figure 17:
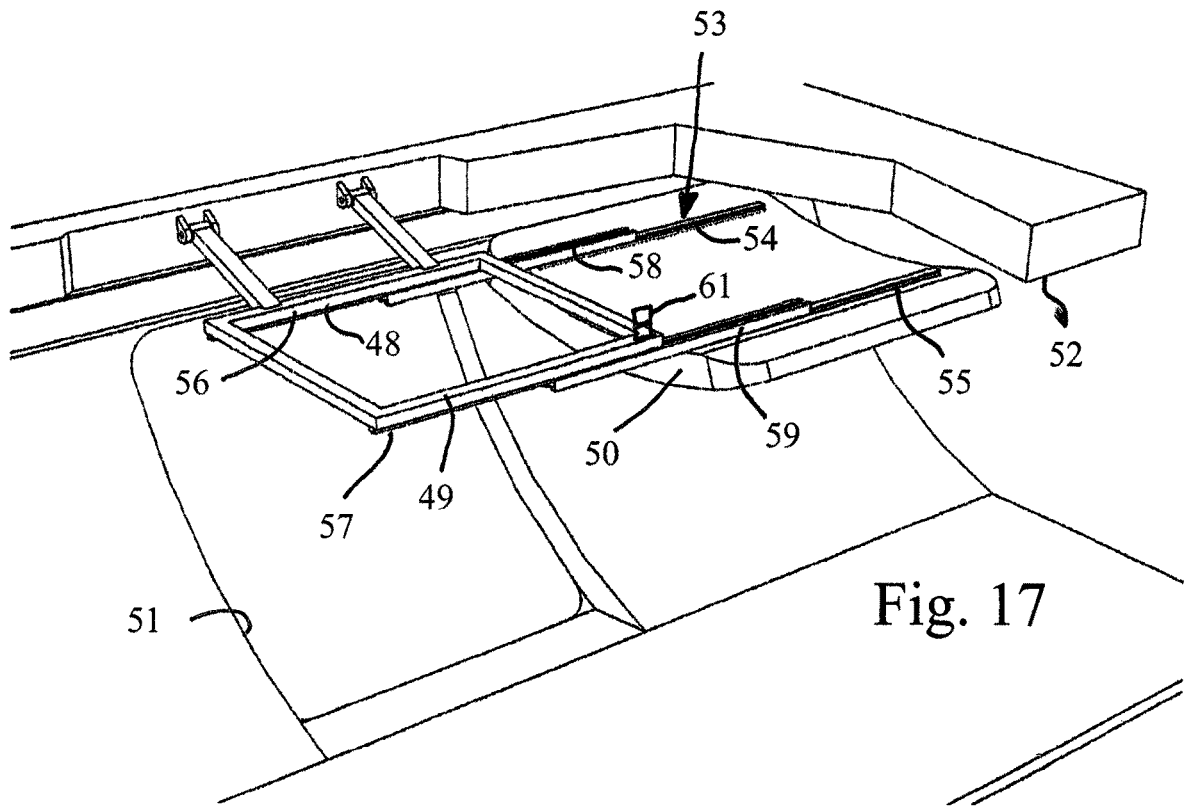

FIGS. 15 to 17 shows an embodiment which enables storing of the open cargo door in a substantially horizontal position close to the ceiling in a direction aft or forward of the cargo door opening.

FIG. 15 shows the cargo door in a closed position. The cargo door 50 is supported by two door hinges 41, 42 via hinge arms 43, 44. The hinge arms are connected to a door frame 45, which may be rectangular. The door frame 45 comprises an upper frame member 48, a lower frame member 49 and two side frame members. The cargo door is connected to the door frame 45 via rails as is described below.

FIG. 16 shows the door 50 in an open position, in which the cargo door 50 is substantially horizontal and is still supported by the cargo door hinges 41, 42. The cargo door is positioned just below a cargo space ceiling 52, which in FIGS. 15 to 17 is partly removed for more clearly showing the structure.

As shown in FIG. 17, the cargo door is provided with a support frame 53 comprising two rail members 54, 55 attached to the inner side of the cargo door 50 and extending in the longitudinal direction. The rectangular frame is provided with two corresponding rail members 56, 57 attached to the bottom side of the upper frame member 48 and the lower frame member 49.

Figure 18:
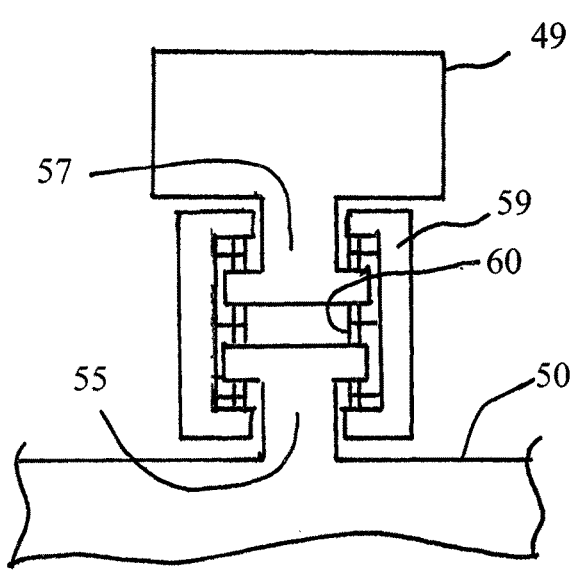
FIG. 18 is a cross-sectional view of a sliding mechanism in the alternative embodiment according to FIGS. 15 to 17.

As shown in FIG. 18, a guide rail 59 (58) encloses both rail member 57 (56) and rail member 55 (54). Several rollers 60 are attached to the guide rail and enables that rail member 55 (54) can slide relative to rail member 57 (56) as shown in FIG. 17. Such a sliding mechanism is well-known in the art and may have other configurations. The rollers 60 may alternatively be bearing balls.

As shown in FIG. 17, the cargo door is moveable in the longitudinal direction of the aircraft into a position, in which the cargo door is free from the cargo door opening. The movement is easy to perform, since no large forces are required for moving the door in the longitudinal direction with the cargo door in a substantially horizontal position.

The door hinges and the door frame may be constructed to withstand the torsional stresses during the longitudinal movement. The door frame may be provided with locking members arranged to anchor the door frame to the ceiling in order to obtain additional support during the longitudinal movement. Such a locking device is shown schematically at reference numeral 61. The locking device is activated after opening of the cargo door from the closed position to the open position shown in FIG. 16. The locking device may be an electromagnet attached to the ceiling of the aircraft and a corresponding ferromagnetic piece attached to the door frame 45 at a suitable location, for example one or several corners of the door frame having the largest distance from the cargo door hinges.

A further locking device may be arranged for locking the rails in one or both of the end positions, so that the cargo door cannot move in the longitudinal direction unintentionally. Similar locking devices may be arranged in all embodiments.

The cargo door and the cargo door hinges are provided with strong springs or other means for supporting the cargo door during the opening movement, as is conventional.

Figure 19:
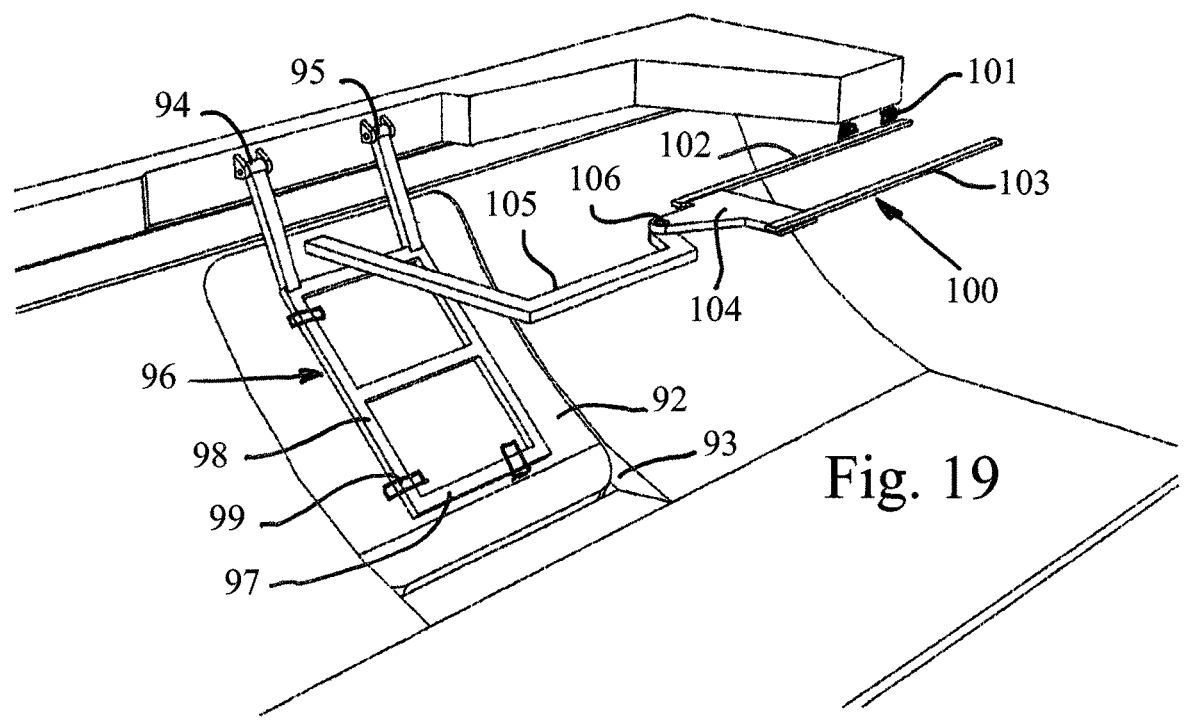
FIGS. 19 to 22 are consecutive perspective views of cargo door positions during inward opening of the cargo door, according to a yet alternative embodiment of the invention.

The door frame 45 may have other configurations than rectangular, for example be arranged in a H-configuration or an 8 configuration, see FIG. 19.

Figure 20:
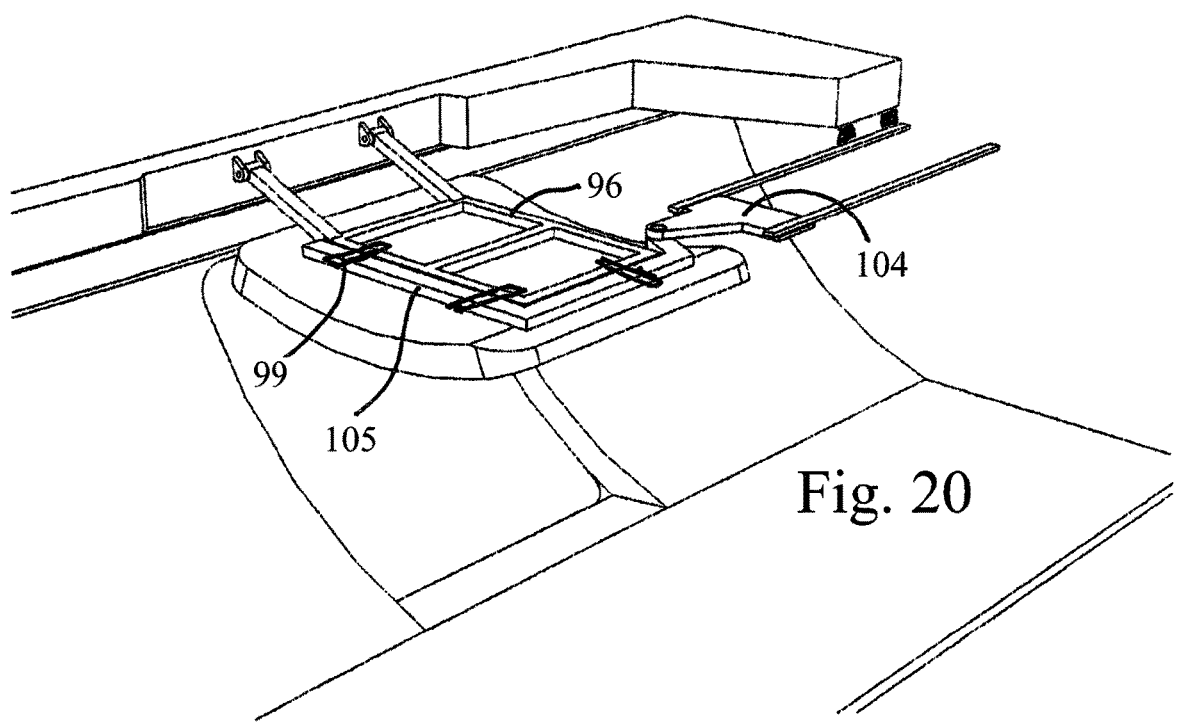

FIGS. 19 to 22 discloses a yet alternative embodiment, which comprises a cargo door 92 arranged in a cargo door opening 93 and pivotable by cargo door hinges 94, 95 to an open, substantially horizontal position, as shown in FIG. 20. A door frame 96 is attached between the door 92 and the hinges 94, 95 so that the door is pivotable between the closed and open positions. The door frame 96 may be rectangular as shown. The door frame comprises a bottom frame member 97 and a side frame member 98. The door frame may comprise further frame members as shown, or arranged in a different configuration.

A support mechanism 100 is fixedly attached to the ceiling of the aircraft as schematically shown by attachment members 101 arranged at suitable places. The support mechanism comprises two rail members 102, 103, which are attached to the ceiling, and a guide plate 104, which is moveable along the two rails in the longitudinal direction of the aircraft. The guide plate 104 supports a support frame 105, which may have a L-form. The support frame 105 is attached to the guide plate 104 via a vertical shaft 106, so that the support frame 105 may rotate around the vertical shaft 106. The support frame 105 is configured to be complimentary to the door frame 96 and door frame members 97, 98, so that the support frame 105 in the open position of the door is arranged beside the frame members 97, 98 as shown in FIG. 20. The door frame 96 is attached to the door 92 via several attachment members 99, three of which are shown in FIGS. 19 and 20. When the support frame is arranged in cooperation with the door frame 96, the attachment members 99 may transfer the door 92 from the door frame 96 to the support frame 105. The transfer may take place by magnetic attachment members 99 or by a mechanical device described below in connection with FIG. 41. After the transfer, the door is supported by the support frame 105 and is free from the door frame 96.

Figure 21:
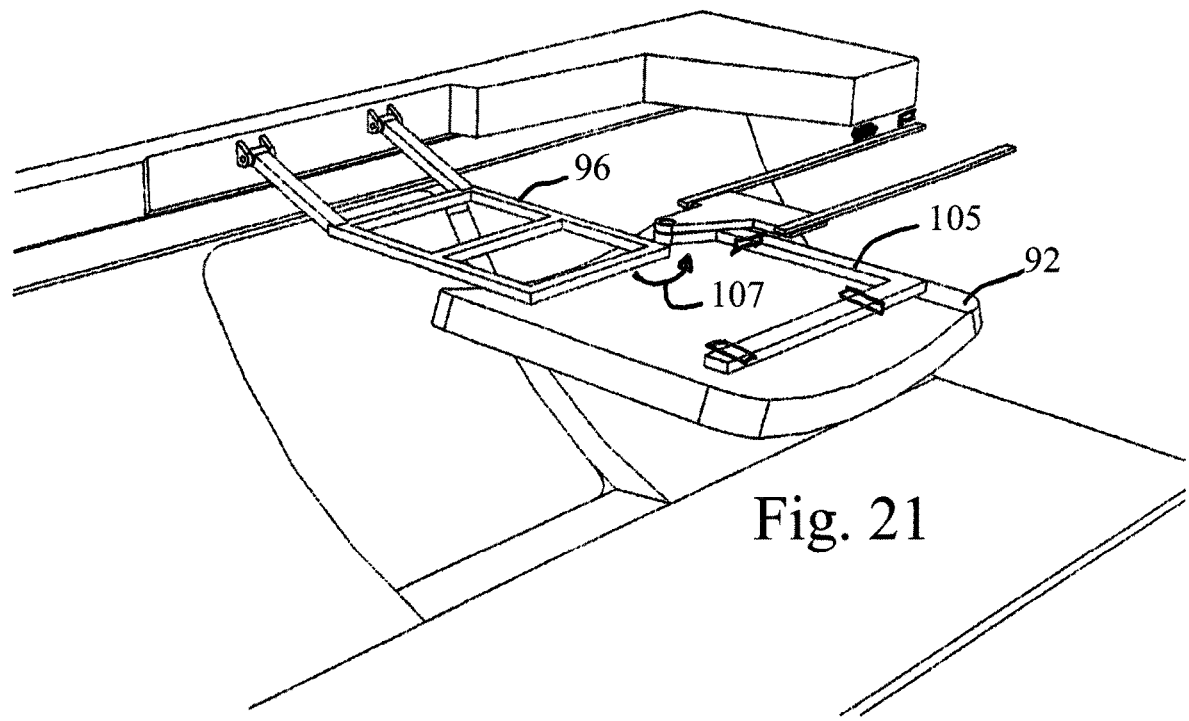

Next, as shown in FIG. 21, the door is rotated 90° around the shaft 106 as shown by arrow 107. In this manner, the door is moved toward the middle of the aircraft, where there is good space to store the cargo door.

Figure 22:
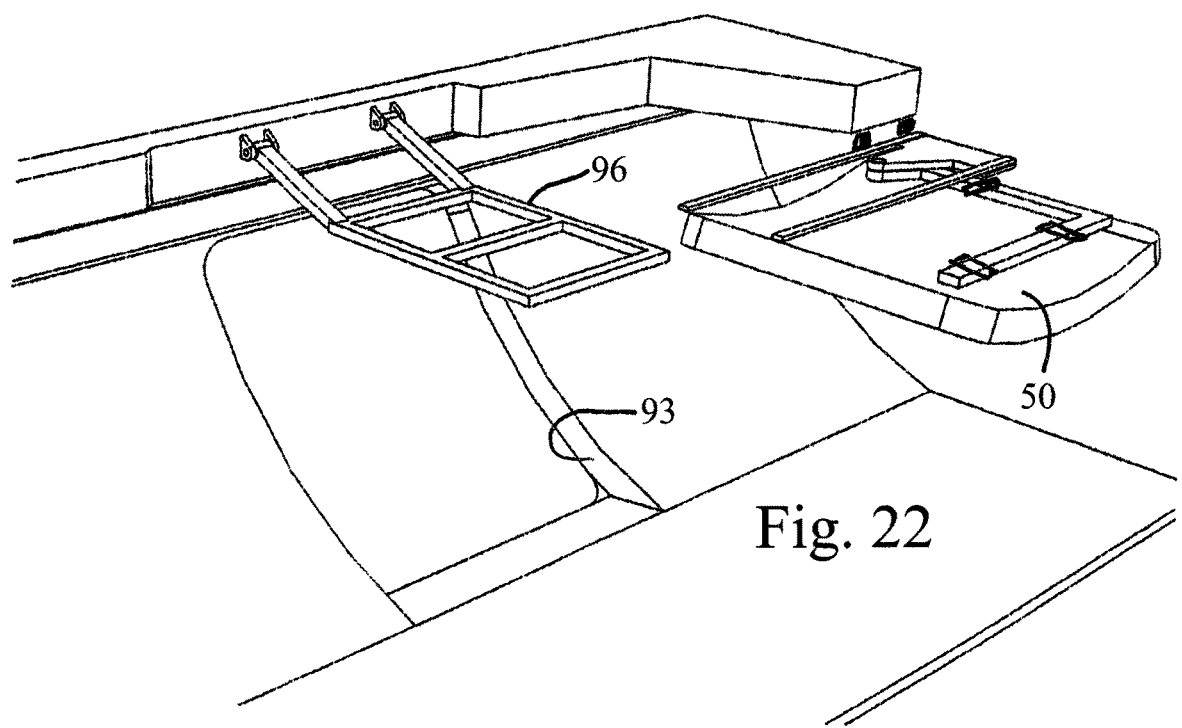

Finally, the door is moved longitudinally as shown in FIG. 22 to a position wherein the cargo door opening 93 is completely free from the cargo door. This movement takes place by moving the guide plate 104 along the rail members 102, 103 until the position shown in FIG. 22 is reached.

When the door should be closed, the opposite actions are undertaken. The movements and rotations may be performed by electric, pneumatic or hydraulic motors, or manually by hand.

Figure 23:
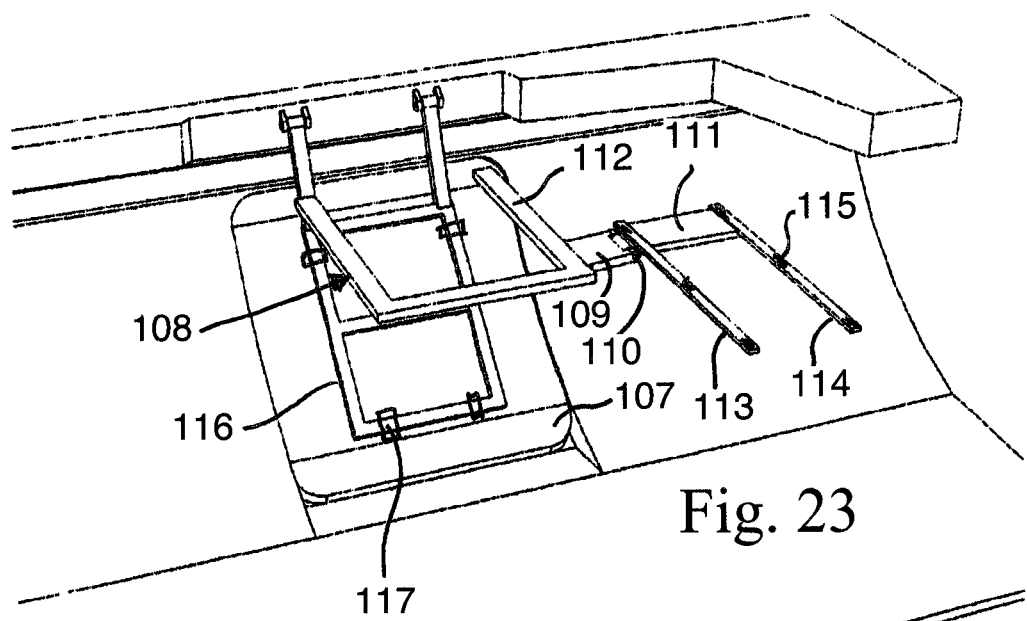
FIGS. 23 to 26 are consecutive perspective views of cargo door positions during inward opening of the cargo door, according to a yet alternative embodiment of the invention.
Figure 24:
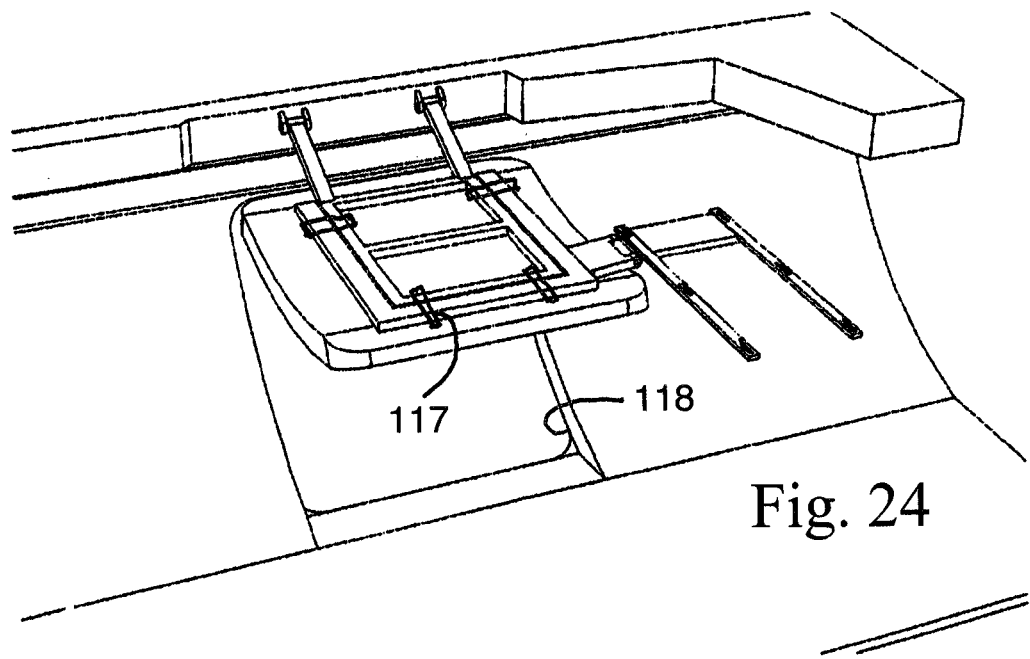

FIGS. 23 to 26 show a further embodiment of the cargo door handling mechanism. A support frame 108 may be a U-frame 112 as shown in FIG. 23. The support frame is provided with a plate 109 which is connected to a guide plate 111 via a horizontal shaft 110. The guide plate is moveable in the transversal direction by two rails 113, 114 attached to the ceiling of the aircraft via attachment members 115, shown schematically in FIG. 23. When the cargo door is pivoted around its hinges to the open position, a door frame 116 similar to door frame 96 will mate with the U-frame 112 as shown in FIG. 24. There are several attachment members 117 arranged to connect the door to the door frame 116 during movement from the closed to the open position. In the open position, the attachment members 117 are arranged to transfer the door to the U-frame 112 as described above and is shown in more details in FIG. 41.

Figure 25:
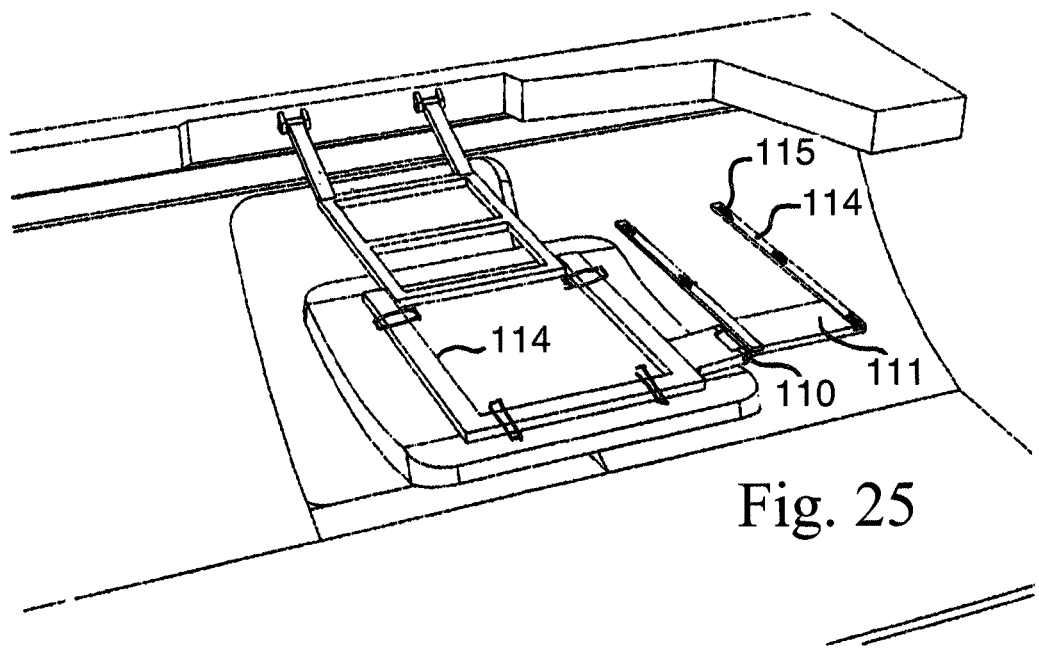
Figure 26:
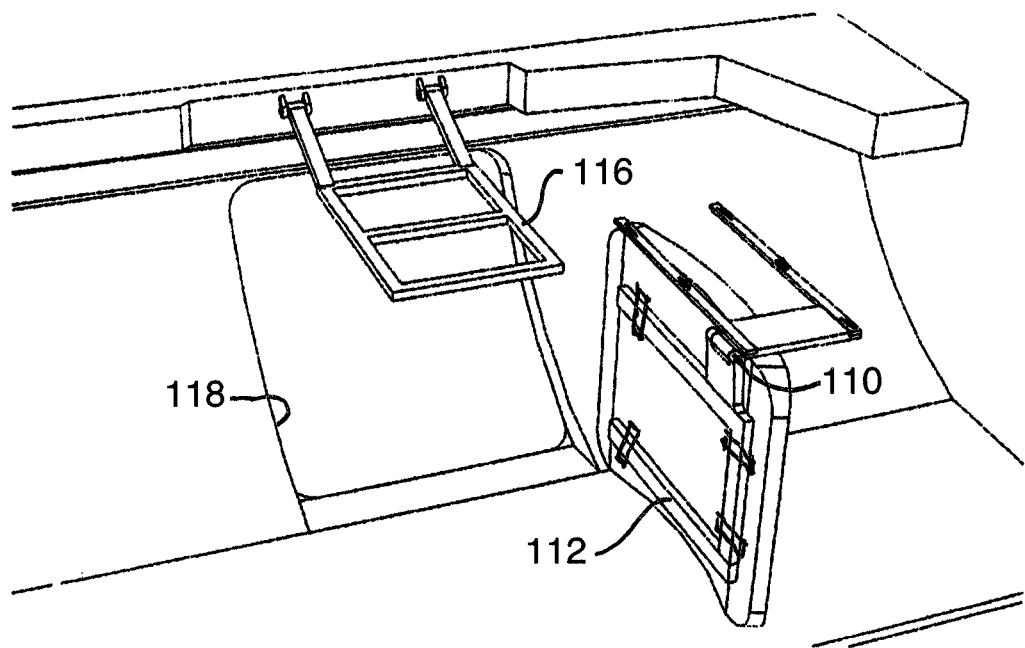

When the door has been transferred to the U-frame 112, the door is moved transversally towards the middle of the cargo compartment by moving the guide plate 111 along the rails 113, 114 as shown in FIG. 25. Finally, the door is pivoted around the horizontal shaft 110 until the door is in a vertical position to the side of the cargo door opening 118, as shown in FIG. 26.

The rails 113, 114 may alternatively be arranged in the same manner as in the embodiment of FIGS. 15 to 18, however, transversally.

If the side space at the side of the cargo door is too small for housing the door in the longitudinal or side direction, another method is required. Such a method is achieved by opening the cargo door inwardly and then moving or tilting the cargo door until it is substantially parallel to the diagonal of the cargo door opening. Since any side of the cargo door is always shorter than the diagonal of the cargo door opening, the cargo door can now be moved out through the cargo door opening and moved to the side of the cargo door opening outside the aircraft. This leave the entire cargo door opening free for loading and unloading cargo.

FIGS. 27 to 41 describe a set of movements for achieving said goal in an embodiment.

FIGS. 27 to 29 are perspective views with the cargo ceiling party broken in slightly different perspective directions.

The cargo door is constructed in a rectangular format, for example square. The door may have rounded corners.

Two rails 121, 122 are attached to the ceiling of the cargo space adjacent the right side 123 of the cargo door as seen from the outside. The two rails run transversal to the aircraft longitudinal direction. The attachment means are not shown, but can be screws or rivets or links of any kind.

A support plate 124 is arranged between the rails and is moveable along the rails from a distal position 120, as shown in FIGS. 27 to 29, to a proximal position as shown in FIGS. 36 to 40 and being further explained below.

Figure 33:
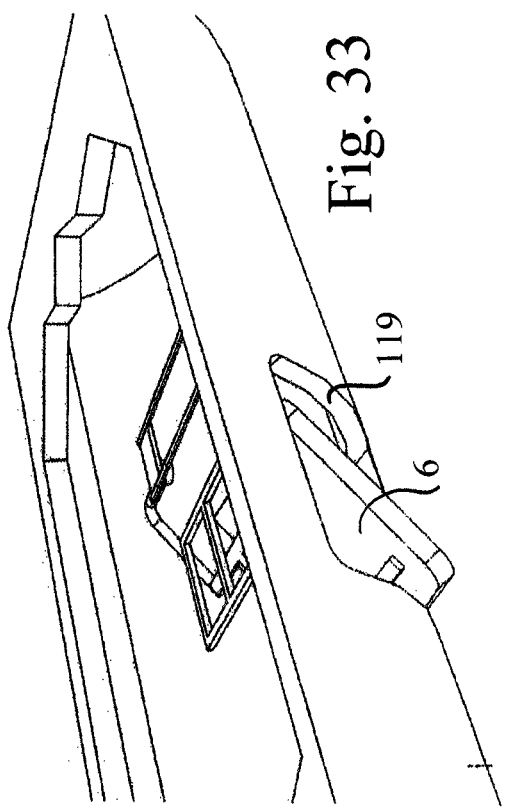
Figure 35:
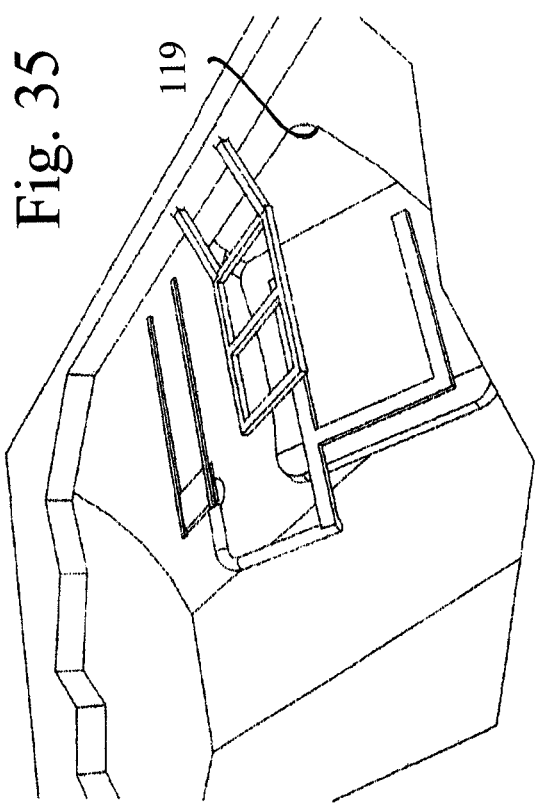
Figure 34:
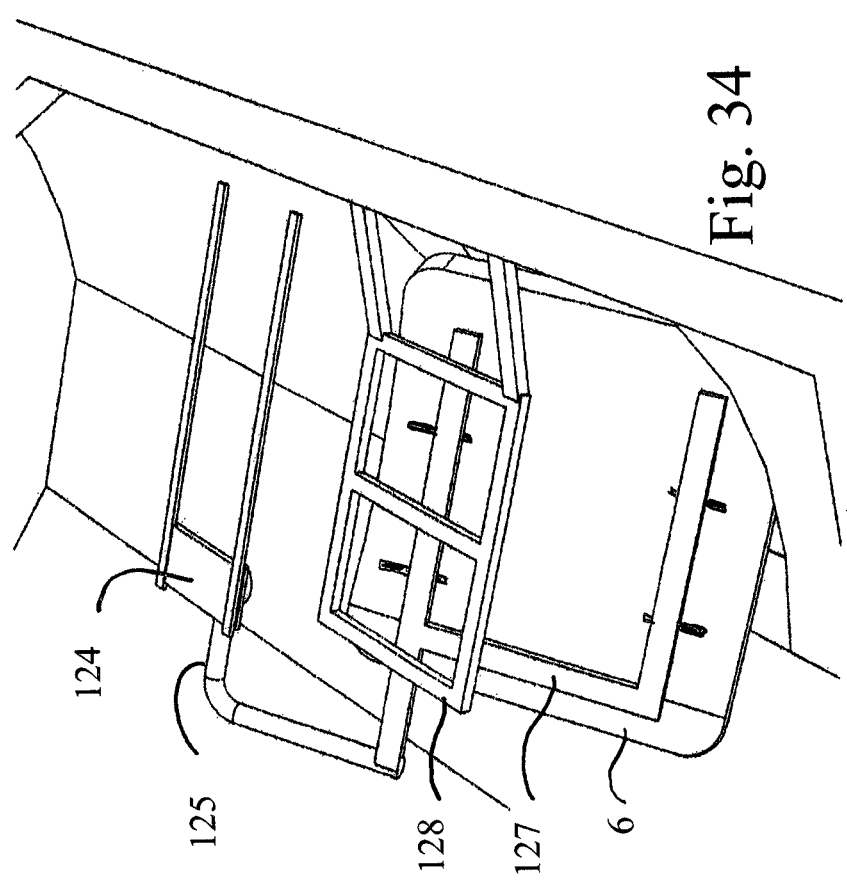

A pivot arm 125 is attached to the support plate 124. The pivot arm 125 is pivotable around a transversal, horizontal axis 119 from a horizontal position as shown in FIGS. 27 to 29 and about 45° downwards as shown in FIGS. 33 to 35. The pivot arm 125 is attached to a first frame portion 126 extending towards the cargo door and forming a support frame 127. The support frame is arranged in a horizontal position in FIGS. 27 to 29.

Figure 30:
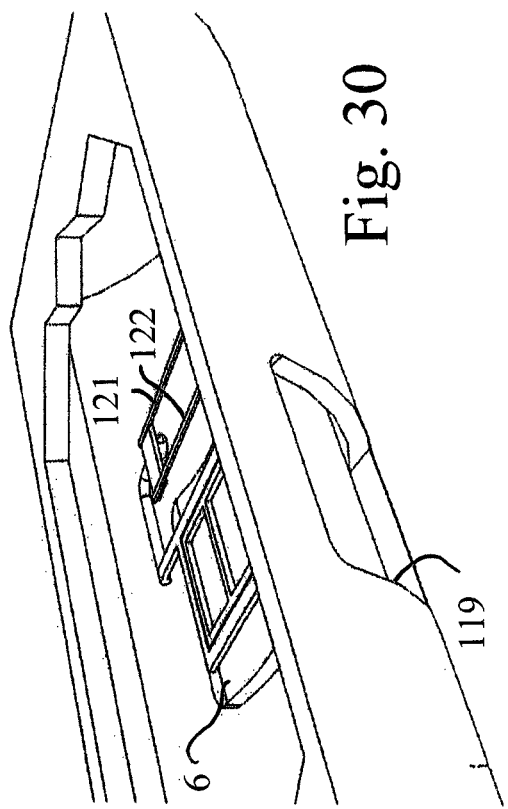
Figure 31:
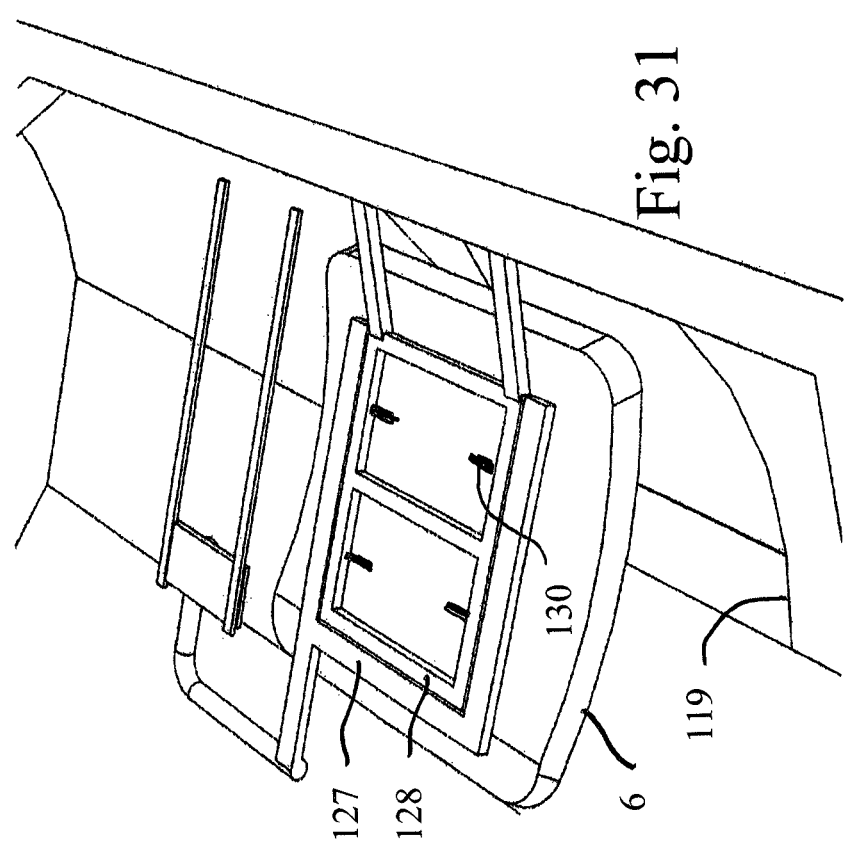

As shown in FIGS. 29 to 31, the cargo door is provided with a door frame 128, which is attached to hinges 129 of the cargo door 6 and the actual cargo door is attached to the door frame 128 by removable attachment means 130 as explained below.

The cargo door 6 is in its closed position in FIGS. 27 to 29. Thus, FIGS. 27 to 29 show a starting position before and when a cargo door is to be opened. In the closed position, the cargo door is supported by the original hinges and the door frame 128 and is locked by several locking means (not shown) arranged along the rim of the cargo door, according to its original construction. The original hinges are provided with springs, which support the door during the opening movements so that only a small force is required for opening the door.

Figure 32:
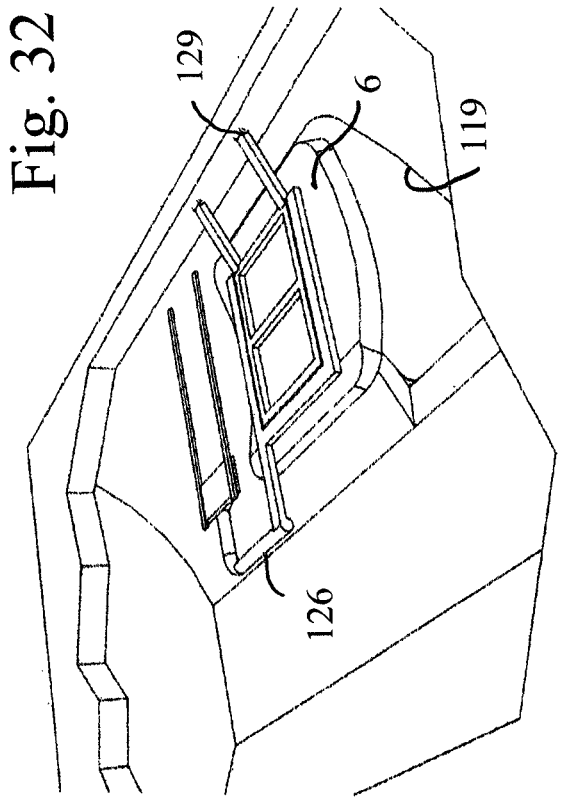

FIGS. 30 to 32 are perspective views similar to FIGS. 27 to 29 and shows a position when the cargo door 6 has been opened and pivoted to substantially its normal open position in a conventional Boeing 737, in a first step.

As shown in FIGS. 30 to 32, the door frame 128 of the cargo door fits inside the support frame 127 of the first frame portion 126 when the cargo door is in its uppermost position. The attachment means 130 are actuated in a second step so that the cargo door is no longer supported by the door frame 128 but instead supported by the support frame 127, as will be described later with reference to FIG. 41.

FIGS. 33 to 35 are perspective views similar to FIGS. 27 to 29 and FIGS. 30 to 32. There is shown that the cargo door 6, which now is supported by the support frame 127 is tilted or pivoted downwards over about 45° by pivoting the pivot arm 125, in a third step. As shown in FIG. 33, the cargo door 6 will now be positioned substantially along a diagonal of a cargo door opening 119. The diagonal of the opening is always longer than the sides of the cargo door.

Figure 36:
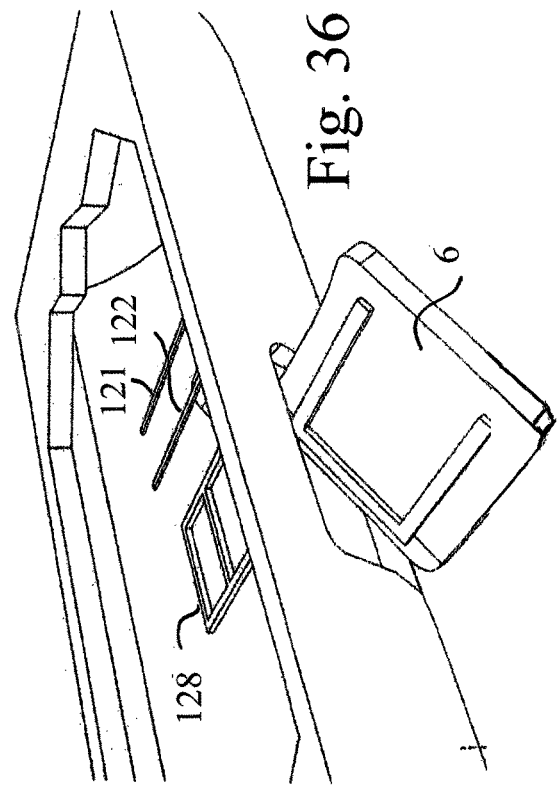
Figure 38:
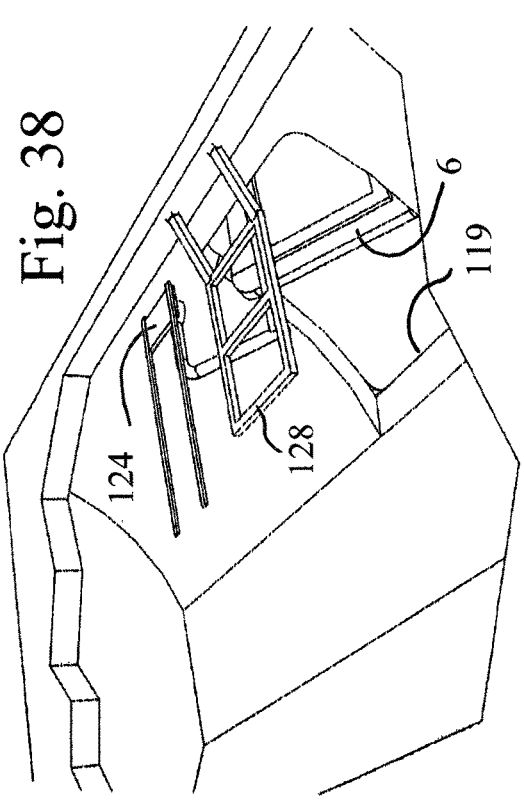
Figure 37:
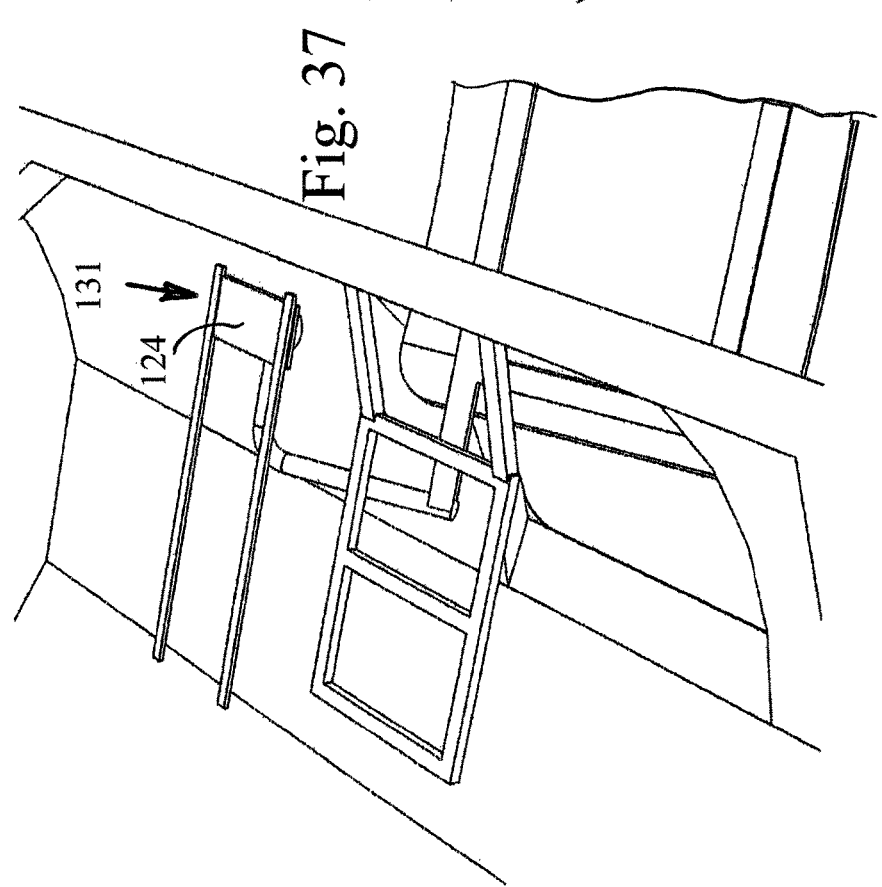

FIGS. 36 to 38 are perspective views similar to FIGS. 27 to 29 and FIGS. 30 to 32 and FIGS. 33 to 35. There is shown how the support plate 124 is moved, in a fourth step, in a transversal direction from its distal position 120 shown in FIGS. 27 to 29 and to a proximal position 131 close to the cargo door opening. During such movement, the cargo door 6 is moved out through the cargo door opening in a linear (horizontal) movement, still parallel with the diagonal of the cargo door opening 119.

Figure 39:
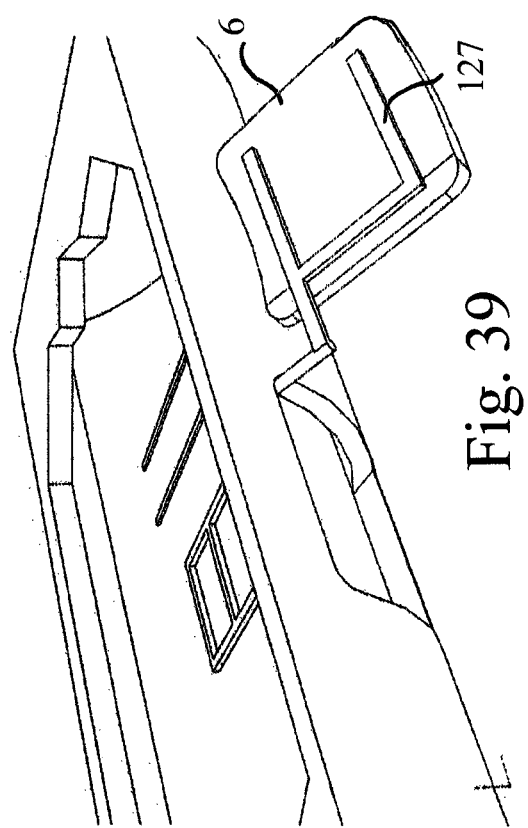
Figure 40:
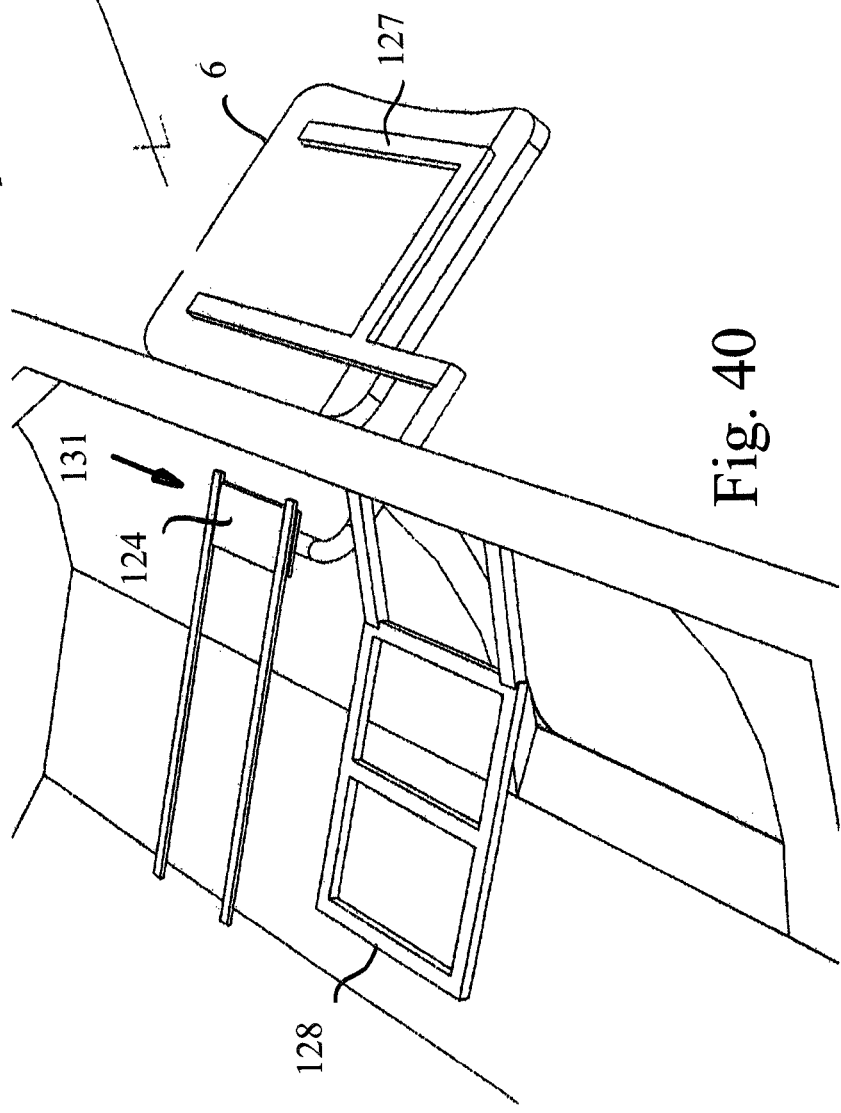

FIGS. 39 to 40 are perspective views similar to FIGS. 27 to 29 and FIGS. 30 to 32 and FIGS. 33 to 35 and FIGS. 36 to 38. There is shown a fifth (optional) step, wherein the cargo door 6 is swung over a vertical axis of the pivot arm 125 so that the cargo door ends in a position at the side of the cargo door opening 119 outside the aircraft. The door frame 128 is still left inside the cargo door opening close to the ceiling. However, the door frame is not beveled and do not occupy a large space. The door frame 128 may be attached to the ceiling by attachment means (not shown).

By moving the cargo door out of the cargo door opening, almost all of the space lost due to the cargo door can be recovered. Only a small portion which the door frame 128 occupies cannot be fully used for loading and unloading cargo.

The closing of the cargo door takes place in the opposite direction.

Figure 41:
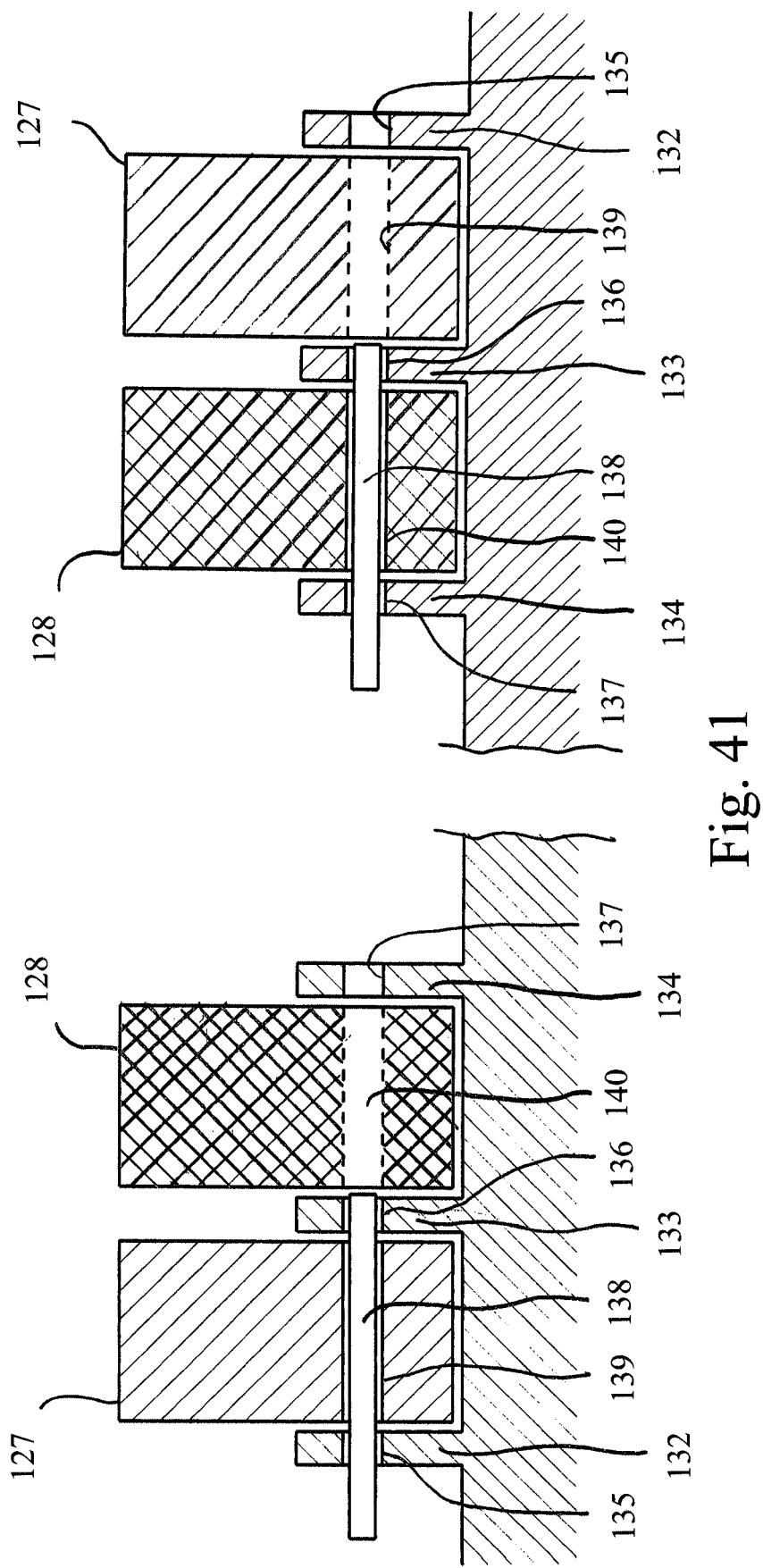
FIG. 41 is a cross-sectional view of a cargo door with attachment means.

FIG. 41 is a cross-sectional view of the removable attachment means 130 discussed above. In the position shown in FIG. 28 both the support frame 127 and the door frame 128 are arranged adjacent the cargo door. The cargo door is provided with three flanges 132, 133, 134 provided with through holes 135, 136, 137. A pin 138 extends through two of the holes 135, 136 or 136, 137.

In the first position of the pin 138, as shown to the right in FIG. 41, the pin 138 extends through holes 136, 137 and through a corresponding hole 140 in the door frame 128. The cargo door is now connected to the door frame 128.

Figure 42:
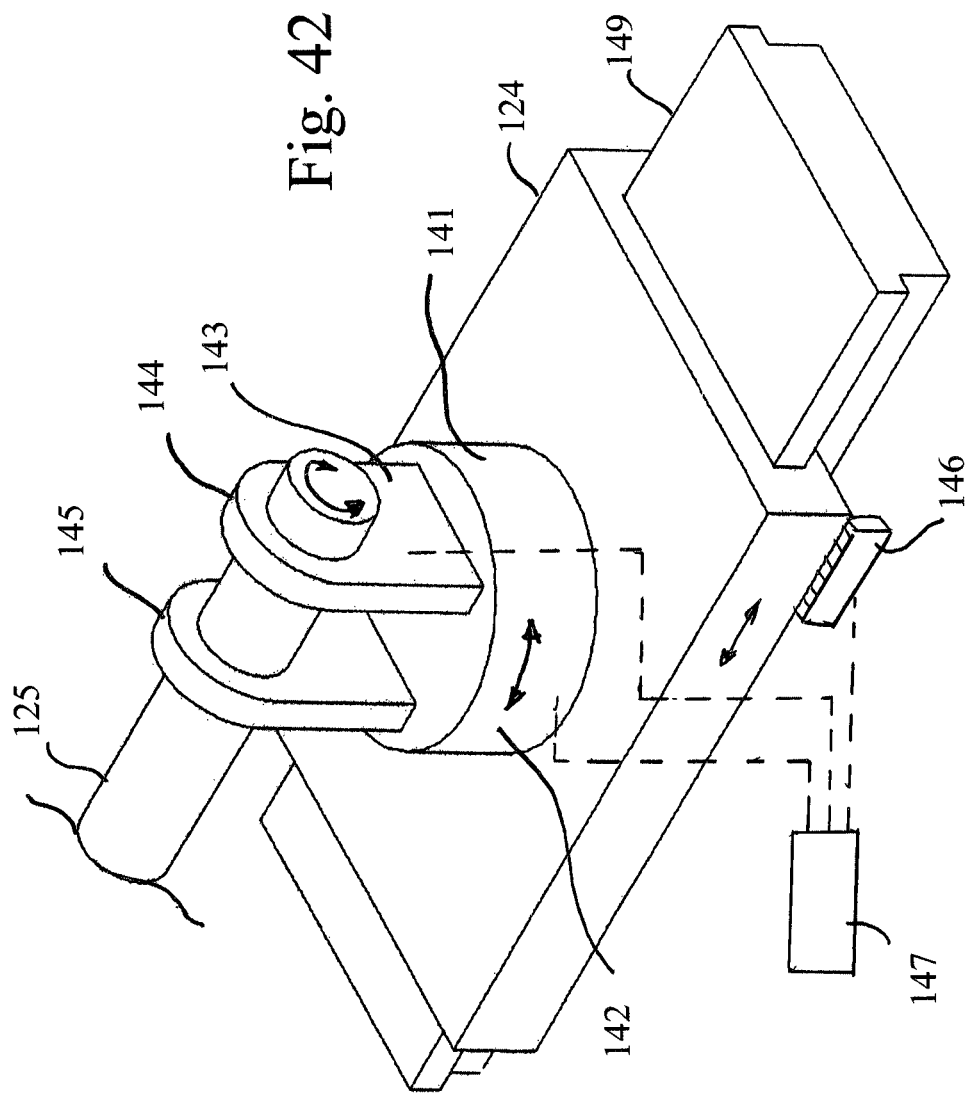
FIG. 42 is am isometric view of a support plate provided with rotational and pivoting means.

In the second position of the pin 138, as shown to the left in FIG. 42 (in a mirror view), the pin 138 extends through holes 135, 136 and through a corresponding hole 139 in the support frame 127. The cargo door is now connected to the support frame 127.

The pin 138 is operated by a linear motor, not shown. Other means for obtaining the desired shift of support of the cargo door from the door frame 128 to the support frame 127 can be used, such as magnetic means or suction cups operated by a vacuum source.

FIG. 42 is a perspective view of the support plate 124 and shows the pivot arm 125 and the corresponding devices for imparting a pivot movement for tilting the cargo door and a rotational movement for the final swinging of the cargo door. The support plate is linearly moveable along a single rail 149 instead of the rails 121 and 122. The support plate 124 is provided with a rotational plate 141, which is rotational around a vertical shaft. In addition, the pivot arm 125 is journalled in bearings 144, 145 permitting the shaft to pivot 45° around a horizontal axis (same as transversal axis) parallel with the pivot arm 125. There are arranged motors 142, 143 for performing the pivoting movement and the rotational movement as well as a motor 146 for translatory movement of the support plate 124. In addition, there is a motor which performs the opening movement of the cargo door (not shown). Thus, all movements are operated by motors or similar. The operator only needs to press a button whereupon all the movements are preformed in sequence under the control of a computer 147.

It is also possible to perform one or several of the steps manually, by moving the respective components manually.

There are arranged latches and links and other means for ensuring that the door is kept in its open and closed positions. This relates to all embodiments.

Alternative means for performing the steps described above may be used.

The removal of the door enables the cargo compartment to be loaded with more goods, since the door is no longer in the way for goods loading. However, there is still a rim 212 at the top portion of the door, which is a restriction, see FIG. 43.

Before loading goods into the aircraft, the goods is collected into load pallets of a size suitable to be loaded into the cargo compartment. The goods is immobilized by means of crimp film or similar.

Figure 43:
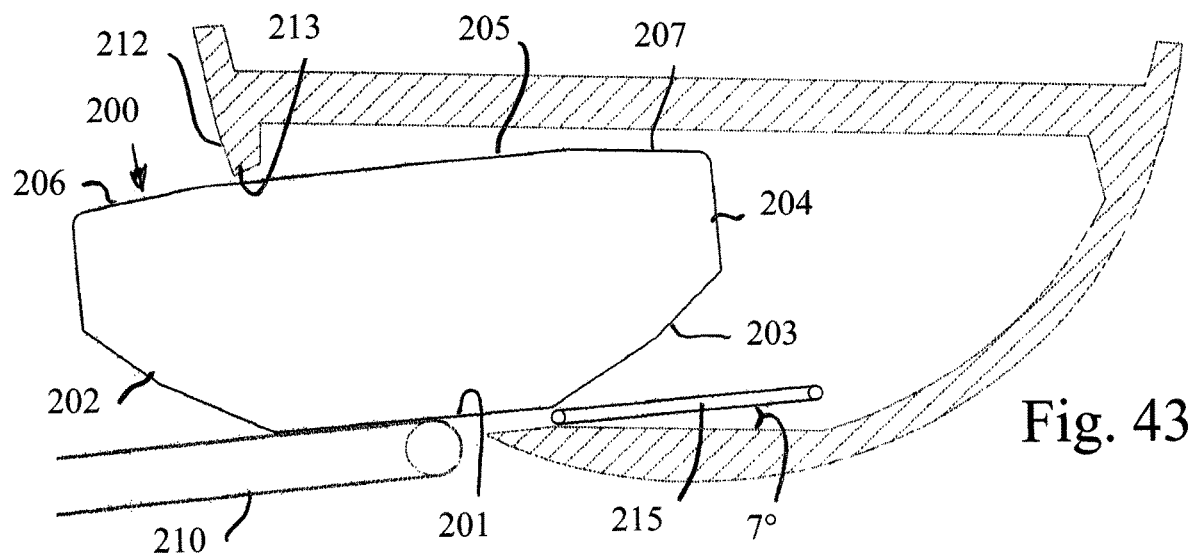
FIGS. 43 to 48 are sequential cross-sectional views of a sequence during loading of a load pallet.

FIG. 43 shows a load pallet 200 having a shape corresponding to the cargo compartment of the aircraft. Thus, the load pallet 200 is provided with a pallet floor surface 201 and a pallet top surface 205. The load pallet is further provided with pallet sloping side surfaces 202 and 203 and pallet vertical side surfaces 204. The exact shape of the load pallet is dependent on the cargo space of the aircraft and is complementary to such cargo space.

The pallet top surface 205 is provided with chamfered surfaces 206 and 207 adjacent each side surface.

The load pallet 200 is loaded by an outer conveyor 210, which has a slope in relation to the horizontal of about 7°. This slope enables the load pallet to pass through a cargo door opening 213 without interfering with the rim 212 of the cargo door opening, as appears from FIG. 43. The slope may be different for different aircraft door arrangements.

In addition, the cargo compartment comprises an inner conveyor 215, which is pivotable from a horizontal position to a sloping position as shown in FIG. 43 with a first angle of 7° in relation to the horizontal.

The chamfer surface 207 of the cargo pallet top surface 205 may have the same slope angle of 7°.

Figure 44:
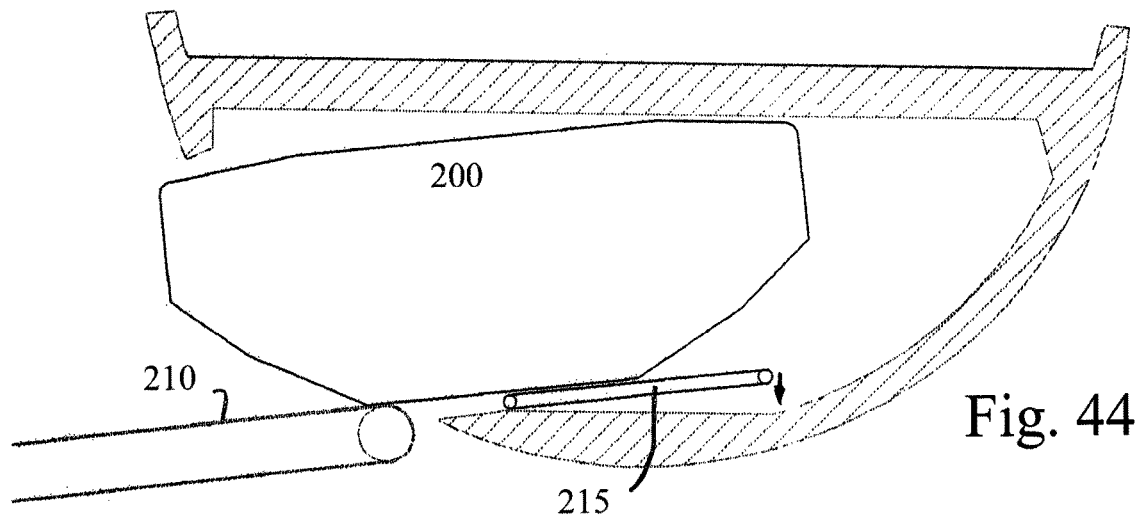

The depth of the chamfered surface 207 is sufficiently large so that the cargo pallet may be pushed into the cargo compartment up to about 50% of its length. The cargo pallet is pushed into the cargo compartment until the chamfered surface 207 almost touches the ceiling of the cargo compartment, as shown in FIG. 44.

Figure 45:
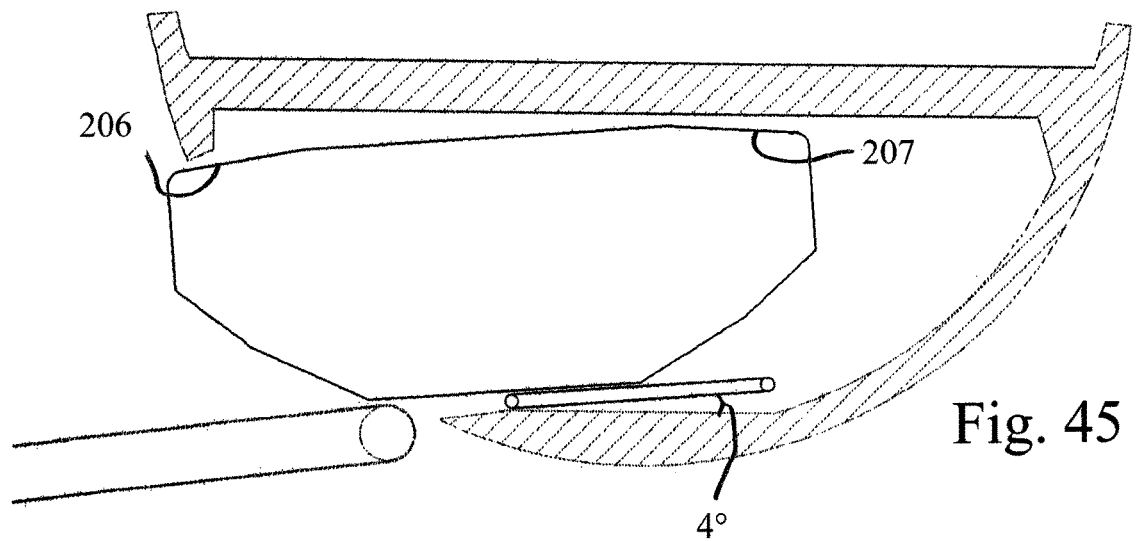

In a second step, the inner conveyor 215 is pivoted down to a second angle of about 4° in relation to the horizontal. The second angle may be about half of the first angle mentioned above. Such pivoting is enabled because of the second chamfered surface 206 of the load pallet, as shown in FIG. 45.

Figure 46:
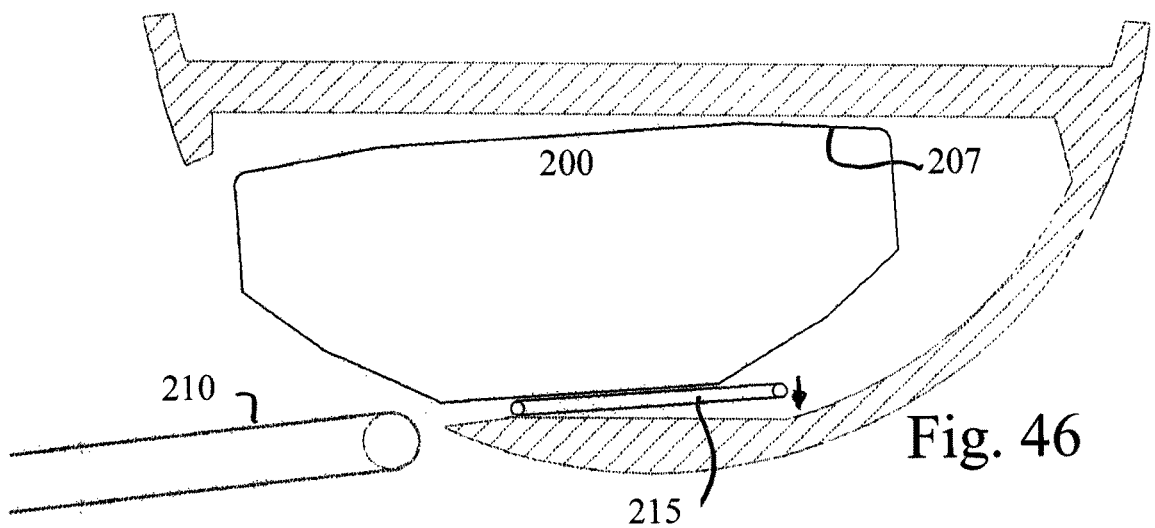

In a third step, the load pallet 200 is pushed further into the cargo compartment by means of inner conveyor 215, until the chamfer surface 207 again approaches the ceiling of the cargo compartment, as shown in FIG. 46.

Figure 47:
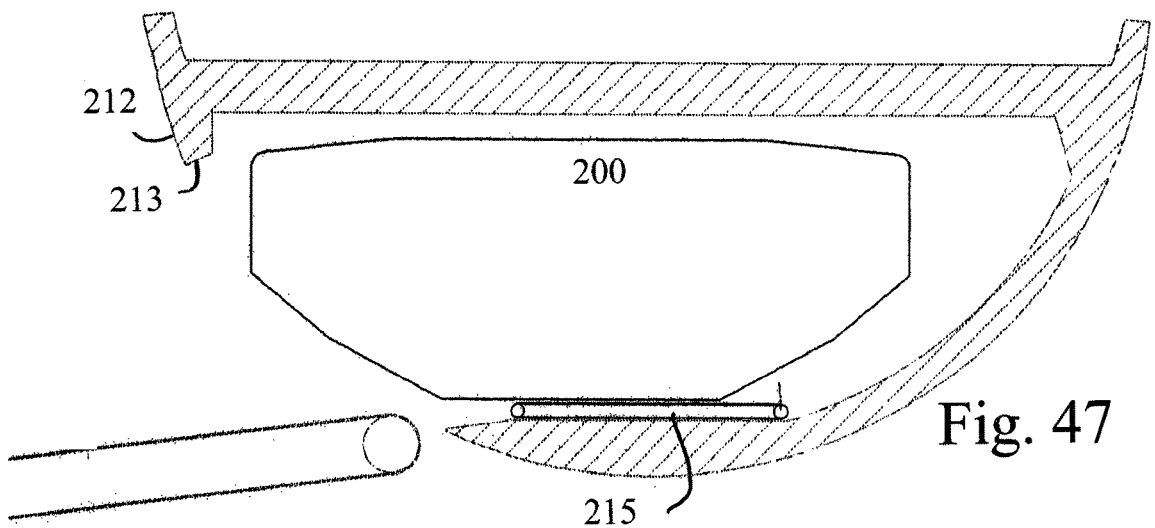
Figure 48:
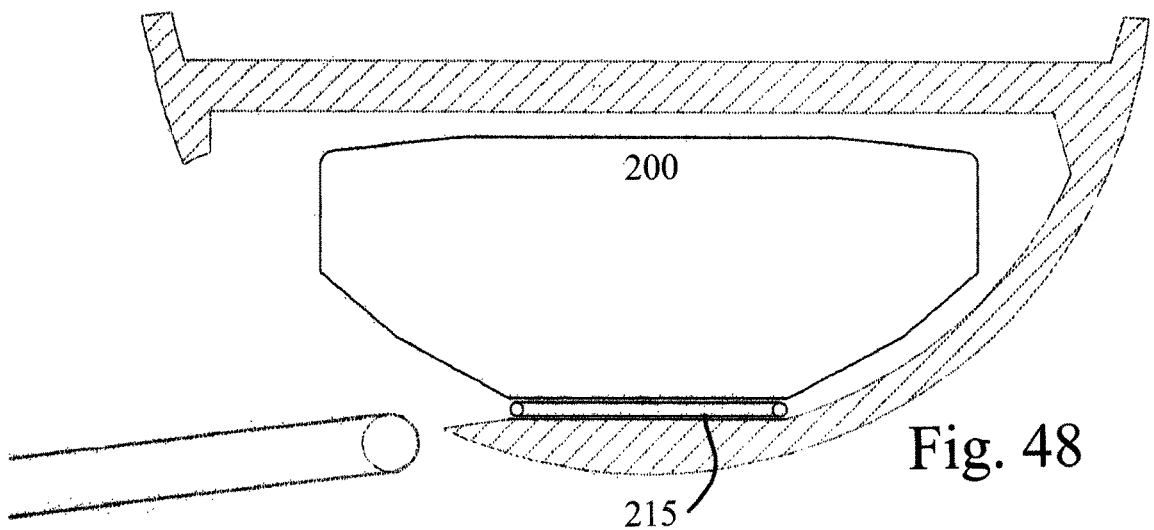

In a fourth step, the inner conveyor is lowered to a horizontal position, which is now possible without the load pallet interfering with the rim 212 of the cargo door opening 213, as shown in FIG. 47 and the inner conveyor 215 pushes the load pallet to its final position as shown in FIG. 48.

As in a normal loading cycle, the load pallet 200 is further transported into the cargo compartment by further conveyors, not shown in the drawings.

Figure 49:
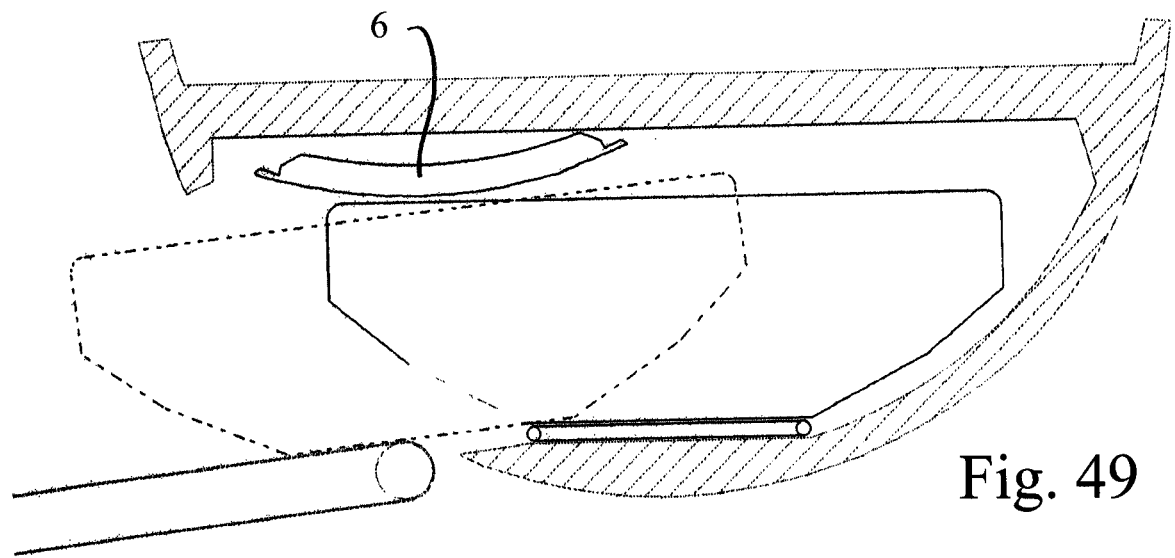
FIGS. 49 to 50 are cross-sectional views for comparing loading of a load pallet without using the inventive concept and with using the inventive concept.

FIG. 49 shows the maximum height of a load pallet with the cargo door 6 in its position previously known.

Figure 50:
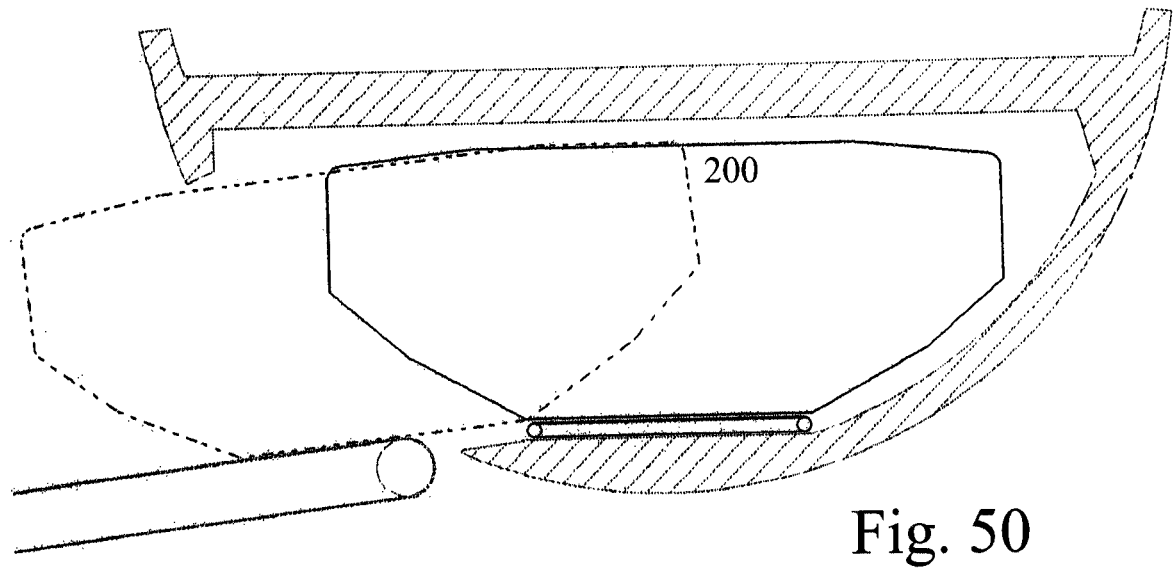
Figure 51:
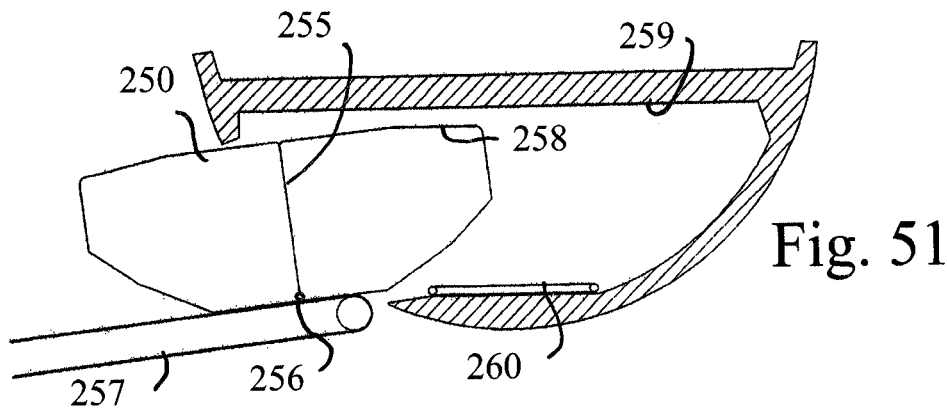
FIGS. 51 to 54 are sequential cross-sectional views of another sequence during loading of a load pallet.

FIG. 50 shows the maximum height of a load pallet 200 loaded with the inclined conveyor. As is evident from FIGS. 49 and 50, a saving of approximately 20% is obtained when the door is removed.

Another embodiment of a loading cycle is shown in FIGS. 51 to 54. A load pallet 250 is provided, which is similar to load pallet 200 but provided with a vertical division line 255 at about the middle of the load pallet. A pivot axis 256 is provided at the lower end of the division line.

In this embodiment, the inner conveyor 260 does not need to be pivotable, which makes the construction more inexpensive and more adaptable to existing structures. The inner conveyor may be fixed. Thus, the inner conveyor does not need to be modified.

Figure 52:
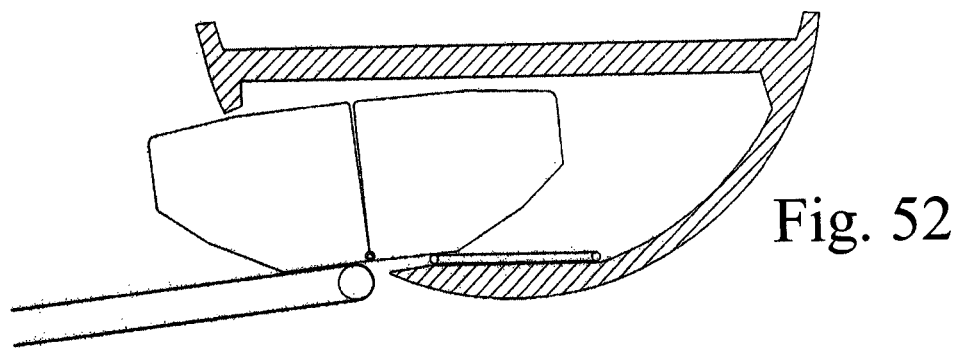
Figure 53:
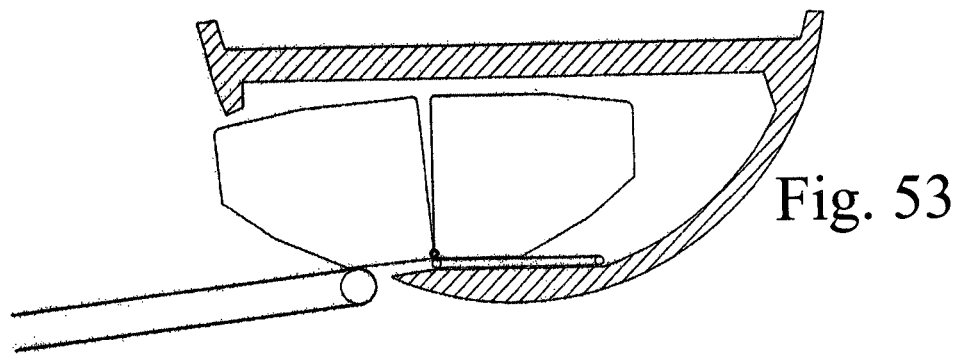
Figure 54:
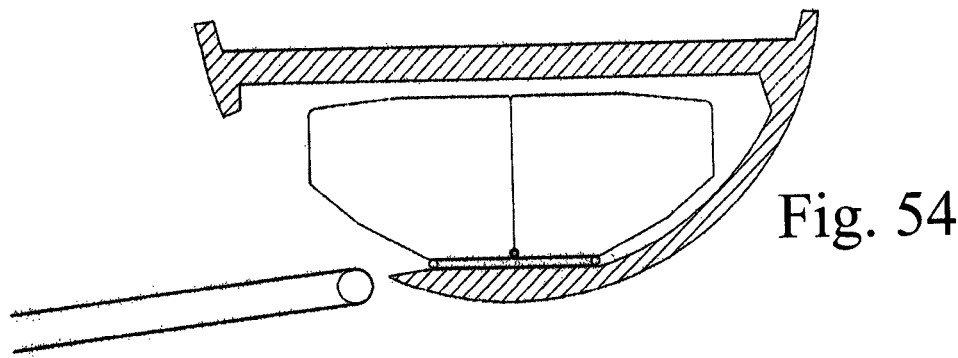

As appears from the drawings, the outer conveyor 257 pushes the load pallet 250 into the cargo compartment until a chamfered upper surface 258 almost touches a ceiling 259 of the cargo compartment. When the load pallet is half-way into the cargo compartment, as shown in FIGS. 52 and 53, the load pallet 250 pivots around its pivot axis 256 so that the right part of the load pallet becomes horizontal and rests on the inner conveyor 260, while the left part of the load pallet still rests on the outer conveyor 257 at an angle of 7°. Finally, the inner conveyor 260 pulls the load pallet into the cargo compartment. During this movement, the left part of the load pallet pivots to a horizontal position, as shown in FIG. 54.

In another embodiment, the load pallet may be divided by a second (and more) division line (not shown) if required to enter the load platform into another broader cargo compartment.

The load pallet may be separated into two load pallets along said division line or division lines, i.e. the pivot axis does not connect the two load pallets.

The outer conveyor is arranged at an angle which is suitable for loading the load pallet through the door opening. Such an angle may be between 3° and 15°, or between 5° and 10° or about 7°. In the first embodiment, the second angle may be half of the first angle.

In the claims, the term "comprises/comprising" does not exclude the presence of other elements or steps. Furthermore, although individually listed, a plurality of means, elements or method steps may be implemented by e.g. a single unit. Additionally, although individual features may be included in different claims or embodiments, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality. Reference signs in the claims are provided merely as a clarifying example and shall not be construed as limiting the scope of the claims in any way.

Although the present invention has been described above with reference to specific embodiment, it is not intended to be limited to the specific form set forth herein. Rather, the invention is limited only by the accompanying claims and other embodiments than those specified above are equally possible within the scope of these appended claims.

The invention claimed is:

1. A method for operating a cargo door of an aircraft, comprising:
    opening the cargo door inwardly in relation to a cargo door opening via door hinges attached to the aircraft adjacent the cargo door opening by pivoting the cargo door from a closed position to an open position, whereby the cargo door in the open position is positioned adjacent a ceiling of a cargo space, whereby the cargo door is supported by a door frame during opening of the cargo door;
    moving the cargo door in relation to the door frame and the hinges to a free position wherein the cargo door opening is substantially free from the cargo door,
    wherein the cargo door is supported by a support frame during the movement, which support frame is moveable in relation to the door frame.

2. The method according to claim 1, further comprising:
    separating the support frame from the door frame and the door hinges, whereby the cargo door is supported by the support frame.

3. The method according to claim 2, further comprising:
    tilting the cargo door until it is substantially parallel to the diagonal of the cargo door opening; and
    moving the tilted cargo door out through the cargo door opening,
    wherein the support frame is attached to the aircraft via a moving mechanism.

4. The method according to claim 3, further comprising moving the cargo door to a side of the cargo door opening outside the aircraft.

5. The method according to claim 2, further comprising:
    moving the cargo door supported by the support frame in a longitudinal direction of the aircraft until the cargo door is free from the cargo door opening.

6. The method according to claim 2, further comprising:
moving the cargo door supported by the support frame in a transversal direction; and
pivoting the cargo door around a horizontal shaft to a vertical position free from the cargo door opening.

7. The method according to claim 1, further comprising:
moving the cargo door supported by the support frame in a longitudinal direction until the cargo door is free from the cargo door opening;
wherein the support frame is supported by the door frame and the hinges and the support frame is moveable in relation to the door frame.

8. A device for operating a cargo door of an aircraft, comprising:
hinges for attaching the cargo door to the aircraft, whereby the cargo door is pivotable from a closed position to an open position, wherein the cargo door in the open position is positioned adjacent a ceiling of a cargo space;
a door frame, which attaches the cargo door to the hinges;
a support frame arranged to support the cargo door during movement of the cargo door to a free position wherein the cargo door opening is substantially free from the cargo door,
a movement mechanism for moving the support frame supporting the cargo door relative to the door frame.

9. The device according to claim 8, further comprising:
the door frame comprising a longitudinal door rail;
the support frame comprising a longitudinal support rail;
a guide rail connecting the door rail to the support rail so that the support rail is moveable in relation the door rail, whereby the cargo door supported by the support frame is moveable to the free position.

10. The device according to claim 8, further comprising:
the support frame having a dimension which is compatible with the door frame;
an attachment member for attaching the door frame to the cargo door wherein the attachment member is actuable for releasing the cargo door from the door frame and for supporting the cargo door by the support frame; and
a first translatory mechanism for moving the cargo door to the free position.

11. The device according to claim 10, further comprising:
a support plate moveable in a transversal direction;
the support frame being attached to the support plate and pivotable by a pivot arm into a position adjacent the door frame;
a pivoting means for pivoting the cargo door when attached to the support frame whereby the cargo door is arranged in a position parallel with a diagonal of a cargo door opening;
a second translatory mechanism for moving the cargo door out of the cargo door opening.

12. The device according to claim 11, further comprising a swinging mechanism for swinging the cargo door outside the cargo door opening.

* * * * *